United States Patent
Tien et al.

(10) Patent No.: US 8,261,181 B2
(45) Date of Patent: Sep. 4, 2012

(54) MULTIDIMENSIONAL METRICS-BASED ANNOTATION

(75) Inventors: Ian Tien, Seattle, WA (US); Chen-I Lim, Bellevue, WA (US); Corey Hulen, Sammamish, WA (US); Zhenyu Tang, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 913 days.

(21) Appl. No.: 11/393,335

(22) Filed: Mar. 30, 2006

(65) Prior Publication Data

US 2007/0234198 A1  Oct. 4, 2007

(51) Int. Cl.
G06F 17/00 (2006.01)
G06Q 10/00 (2012.01)

(52) U.S. Cl. ........ 715/230; 715/233; 705/7.38; 705/7.39
(58) Field of Classification Search .......... 715/230; 705/7.29, 7.39
See application file for complete search history.

(56) References Cited

U.S. PATENT DOCUMENTS

| | | | |
|---|---|---|---|
| 5,018,077 A | 5/1991 | Healey | 715/509 |
| 5,233,552 A | 8/1993 | Brittan | 708/445 |
| 5,253,362 A * | 10/1993 | Nolan et al. | 707/1 |
| 5,404,295 A * | 4/1995 | Katz et al. | 715/231 |
| 5,473,747 A | 12/1995 | Bird | 715/848 |
| 5,615,347 A | 3/1997 | Davis et al. | 715/833 |
| 5,675,553 A | 10/1997 | O'Brien, Jr. et al. | 367/135 |
| 5,675,782 A | 10/1997 | Montague et al. | 726/4 |
| 5,680,636 A | 10/1997 | Levine | 395/800 |
| 5,758,351 A | 5/1998 | Gibson et al. | 707/104 |
| 5,764,890 A | 6/1998 | Glasser et al. | 726/11 |
| 5,779,566 A | 7/1998 | Wilens | 473/407 |
| 5,797,136 A | 8/1998 | Boyer et al. | 707/2 |
| 5,819,225 A | 10/1998 | Eastwood et al. | 704/275 |
| 5,832,504 A | 11/1998 | Tripathi et al. | 715/235 |
| 5,838,313 A * | 11/1998 | Hou et al. | 715/201 |
| 5,845,270 A | 12/1998 | Schatz | 706/11 |
| 5,877,758 A | 3/1999 | Seybold | 715/866 |
| 5,911,143 A | 6/1999 | Deinhart et al. | 1/1 |
| 5,926,794 A | 7/1999 | Fethe | 705/11 |
| 5,941,947 A | 8/1999 | Brown et al. | 709/225 |
| 5,943,666 A | 8/1999 | Kleewein et al. | 1/1 |
| 5,956,691 A | 9/1999 | Powers | 705/4 |
| 6,012,044 A | 1/2000 | Maggioncalda et al. | 705/36 R |

(Continued)

FOREIGN PATENT DOCUMENTS

EP  1 128 299 A1  8/2001

(Continued)

OTHER PUBLICATIONS

U.S. Official Action mailed Dec. 24, 2008 in U.S. Appl. No. 11/624,171.

(Continued)

Primary Examiner — Chau Nguyen
(74) Attorney, Agent, or Firm — Merchant & Gould

(57) ABSTRACT

Persistent annotations are created on a scorecard that combines multi-dimensional as well as fixed value data. The annotations uniquely defined by the scorecard view definition and by the retrieved scorecard data, are independent of the data's dimensionality enabling persistence of the annotations with the data and definition even when the scorecard is reconfigured. The annotations may include a "bubble-up" feature, where a hierarchical structure of the scorecard is inherited by the annotations. Threaded discussions and updated document lists are enabled around the annotations with appropriate permissions and/or credentials.

18 Claims, 8 Drawing Sheets

U.S. PATENT DOCUMENTS

| | | | |
|---|---|---|---|
| 6,023,714 A | 2/2000 | Hill et al. | 715/235 |
| 6,061,692 A | 5/2000 | Thomas et al. | 707/613 |
| 6,115,705 A | 9/2000 | Larson | 1/1 |
| 6,119,137 A | 9/2000 | Smith et al. | 715/234 |
| 6,141,655 A | 10/2000 | Johnson | 707/2 |
| 6,163,779 A | 12/2000 | Mantha | 707/100 |
| 6,182,022 B1 | 1/2001 | Mayle et al. | 702/182 |
| 6,216,066 B1 | 4/2001 | Goebel et al. | 701/29 |
| 6,226,635 B1 | 5/2001 | Katariya | 1/1 |
| 6,230,310 B1 | 5/2001 | Arrouye et al. | 717/136 |
| 6,233,573 B1 | 5/2001 | Bair | 707/3 |
| 6,249,784 B1 | 6/2001 | Macke | 707/3 |
| 6,308,206 B1 | 10/2001 | Singh | 709/223 |
| 6,321,206 B1 | 11/2001 | Honarvar | 705/7 |
| 6,341,277 B1 | 1/2002 | Coden et al. | 1/1 |
| 6,345,279 B1 | 2/2002 | Li et al. | 715/202 |
| 6,389,434 B1 | 5/2002 | Rivette | 707/512 |
| 6,393,406 B1 | 5/2002 | Eder | 705/7 |
| 6,421,670 B1 | 7/2002 | Fourman | 707/10 |
| 6,463,431 B1 | 10/2002 | Schmitt | 1/1 |
| 6,466,935 B1 | 10/2002 | Stuart | 1/1 |
| 6,493,733 B1 | 12/2002 | Pollack | 715/513 |
| 6,516,324 B1 | 2/2003 | Jones | 707/104.1 |
| 6,519,603 B1 * | 2/2003 | Bays et al. | 707/102 |
| 6,522,342 B1 | 2/2003 | Gagnon et al. | 715/716 |
| 6,529,215 B2 * | 3/2003 | Golovchinsky et al. | 715/764 |
| 6,563,514 B1 | 5/2003 | Samar | 715/711 |
| 6,578,004 B1 | 6/2003 | Cimral | 705/7 |
| 6,601,233 B1 | 7/2003 | Underwood | 717/102 |
| 6,604,084 B1 | 8/2003 | Powers et al. | 705/11 |
| 6,606,627 B1 | 8/2003 | Guthrie et al. | 1/1 |
| 6,628,312 B1 | 9/2003 | Rao | 715/853 |
| 6,633,889 B2 | 10/2003 | Dessloch et al. | 1/1 |
| 6,658,432 B1 | 12/2003 | Alavi et al. | 707/104.1 |
| 6,665,577 B2 | 12/2003 | Onyshkevych et al. | 700/130 |
| 6,677,963 B1 | 1/2004 | Mani et al. | 715/764 |
| 6,687,735 B1 | 2/2004 | Logston et al. | 709/203 |
| 6,687,878 B1 | 2/2004 | Eintracht | 707/512 |
| 6,728,724 B1 | 4/2004 | Megiddo et al. | 1/1 |
| 6,763,134 B2 | 7/2004 | Cooper et al. | 382/162 |
| 6,772,137 B1 | 8/2004 | Hurwood et al. | 707/2 |
| 6,775,675 B1 | 8/2004 | Nwabueze | 707/100 |
| 6,782,421 B1 | 8/2004 | Soles et al. | 709/223 |
| 6,785,675 B1 | 8/2004 | Graves et al. | 1/1 |
| 6,804,657 B1 | 10/2004 | Sultan | 705/7.31 |
| 6,831,575 B2 | 12/2004 | Wu et al. | 341/50 |
| 6,831,668 B2 | 12/2004 | Cras | 715/853 |
| 6,842,176 B2 | 1/2005 | Sang'Udi | 345/440 |
| 6,850,891 B1 | 2/2005 | Forman | 705/7 |
| 6,854,091 B1 | 2/2005 | Beaudoin | 715/854 |
| 6,859,798 B1 | 2/2005 | Bedell et al. | 706/45 |
| 6,867,764 B2 | 3/2005 | Ludtke | 345/173 |
| 6,868,087 B1 | 3/2005 | Agarwala et al. | 370/412 |
| 6,874,126 B1 | 3/2005 | Lapidous | 715/711 |
| 6,898,603 B1 | 5/2005 | Petculescu | 707/101 |
| 6,900,808 B2 | 5/2005 | Lassiter | 345/440 |
| 6,901,426 B1 | 5/2005 | Powers et al. | 709/203 |
| 6,917,921 B2 | 7/2005 | Cimral et al. | 705/7 |
| 6,959,306 B2 | 10/2005 | Nwabueze | 707/104.1 |
| 6,963,826 B2 | 11/2005 | Hanaman et al. | 703/2 |
| 6,968,312 B1 | 11/2005 | Jordan | 705/7 |
| 6,973,616 B1 | 12/2005 | Cottrille | 715/512 |
| 6,976,086 B2 | 12/2005 | Sadeghi et al. | 709/236 |
| 6,988,076 B2 | 1/2006 | Ouimet | 705/7 |
| 6,995,768 B2 | 2/2006 | Jou | 345/440 |
| 7,013,285 B1 | 3/2006 | Rebane | 705/10 |
| 7,015,911 B2 | 3/2006 | Shaughnessy et al. | 345/440 |
| 7,027,051 B2 | 4/2006 | Alford et al. | 345/440 |
| 7,043,524 B2 | 5/2006 | Shah et al. | 709/203 |
| 7,058,638 B2 | 6/2006 | Singh | 707/100 |
| 7,065,784 B2 | 6/2006 | Hopmann et al. | 726/4 |
| 7,079,010 B2 | 7/2006 | Champlin | 340/286.02 |
| 7,158,628 B2 | 1/2007 | McConnell et al. | 379/265.02 |
| 7,181,417 B1 | 2/2007 | Langseth et al. | 705/26 |
| 7,200,595 B2 | 4/2007 | Dutta et al. | 1/1 |
| 7,216,116 B1 | 5/2007 | Nilsson et al. | 1/1 |
| 7,222,308 B2 | 5/2007 | Sauermann et al. | 715/833 |
| 7,224,847 B2 * | 5/2007 | Zhang et al. | 382/254 |
| 7,249,120 B2 | 7/2007 | Bruno et al. | 1/1 |
| 7,275,024 B2 | 9/2007 | Yeh et al. | 703/2 |
| 7,302,421 B2 | 11/2007 | Aldridge | 1/1 |
| 7,302,431 B1 | 11/2007 | Apollonsky et al. | 1/1 |
| 7,302,444 B1 | 11/2007 | Dunmore et al. | 1/1 |
| 7,313,561 B2 | 12/2007 | Lo et al. | 1/1 |
| 7,340,448 B2 | 3/2008 | Santosuosso | 1/1 |
| 7,349,862 B2 | 3/2008 | Palmer et al. | 705/7 |
| 7,349,877 B2 | 3/2008 | Ballow et al. | 705/36 R |
| 7,359,865 B1 | 4/2008 | Connor et al. | 705/10 |
| 7,383,247 B2 | 6/2008 | Li et al. | 1/1 |
| 7,398,240 B2 | 7/2008 | Ballow et al. | 705/35 |
| 7,406,431 B2 | 7/2008 | Spira et al. | 705/7 |
| 7,409,357 B2 | 8/2008 | Schaf et al. | 705/7 |
| 7,412,398 B1 | 8/2008 | Bailey | 705/10 |
| 7,433,876 B2 | 10/2008 | Spivack et al. | 1/1 |
| 7,440,976 B2 | 10/2008 | Hart et al. | 707/203 |
| 7,454,393 B2 | 11/2008 | Horvitz et al. | 706/46 |
| 7,496,852 B2 | 2/2009 | Eichorn et al. | 715/764 |
| 7,496,857 B2 | 2/2009 | Stata et al. | 715/833 |
| 7,509,343 B1 | 3/2009 | Washburn et al. | 707/104.1 |
| 7,546,226 B1 | 6/2009 | Yeh et al. | 703/2 |
| 7,546,246 B1 | 6/2009 | Stamm et al. | 705/7 |
| 7,548,912 B2 | 6/2009 | Gideoni et al. | 1/1 |
| 7,559,023 B2 | 7/2009 | Hays et al. | 715/255 |
| 7,568,217 B1 | 7/2009 | Prasad et al. | 726/3 |
| 7,587,665 B2 | 9/2009 | Crow et al. | 715/212 |
| 7,587,755 B2 | 9/2009 | Kramer | 726/4 |
| 7,599,848 B2 | 10/2009 | Wefers et al. | 705/7 |
| 7,613,625 B2 | 11/2009 | Heinrich | 705/7 |
| 7,617,177 B2 | 11/2009 | Bukary et al. | 1/1 |
| 7,617,187 B2 | 11/2009 | Zhu et al. | 715/243 |
| 7,630,965 B1 | 12/2009 | Erickson et al. | 1/1 |
| 7,634,478 B2 | 12/2009 | Yang et al. | 1/1 |
| 7,636,709 B1 | 12/2009 | Srikant et al. | |
| 7,640,506 B2 | 12/2009 | Pratley et al. | 715/751 |
| 7,660,731 B2 | 2/2010 | Chaddha et al. | 705/8 |
| 7,667,582 B1 | 2/2010 | Waldorf | 340/440 |
| 7,685,207 B1 | 3/2010 | Helms | 707/790 |
| 7,694,270 B2 | 4/2010 | Manikotia et al. | 717/101 |
| 7,698,349 B2 | 4/2010 | Hulen et al. | 707/805 |
| 7,702,554 B2 | 4/2010 | Ballow et al. | 705/35 |
| 7,702,779 B1 | 4/2010 | Gupta et al. | 709/224 |
| 7,707,490 B2 | 4/2010 | Hays et al. | 715/234 |
| 7,716,253 B2 | 5/2010 | Netz et al. | 707/803 |
| 7,716,278 B2 | 5/2010 | Beringer et al. | 709/203 |
| 7,716,571 B2 | 5/2010 | Tien et al. | 715/212 |
| 7,716,592 B2 | 5/2010 | Tien et al. | 715/744 |
| 7,725,947 B2 | 5/2010 | Bukary et al. | 726/30 |
| 7,730,023 B2 | 6/2010 | MacGregor | 707/603 |
| 7,730,123 B1 | 6/2010 | Erickson et al. | 709/203 |
| 7,739,148 B2 | 6/2010 | Suzuki et al. | 705/26 |
| 7,747,572 B2 | 6/2010 | Scott et al. | 707/636 |
| 7,752,094 B2 | 7/2010 | Davidson et al. | 705/31 |
| 7,752,301 B1 | 7/2010 | Maiocco et al. | 709/224 |
| 7,778,910 B2 | 8/2010 | Ballow et al. | 705/36 R |
| 7,788,280 B2 | 8/2010 | Singh et al. | 707/791 |
| 7,792,774 B2 | 9/2010 | Friedlander et al. | 706/47 |
| 7,822,662 B2 | 10/2010 | Guzik et al. | 705/35 |
| 7,831,464 B1 | 11/2010 | Nichols et al. | 705/7.39 |
| 7,840,896 B2 | 11/2010 | Tien et al. | 715/243 |
| 7,848,947 B1 | 12/2010 | McGloin et al. | |
| 7,899,833 B2 * | 3/2011 | Stevens et al. | 707/754 |
| 7,899,843 B2 * | 3/2011 | Dettinger et al. | 707/783 |
| 7,904,797 B2 * | 3/2011 | Wong et al. | 715/200 |
| 8,126,750 B2 | 2/2012 | Tien et al. | |
| 8,190,992 B2 | 5/2012 | Tien et al. | |
| 2001/0004256 A1 | 6/2001 | Iwata et al. | 345/204 |
| 2001/0051835 A1 | 12/2001 | Cline | 700/91 |
| 2001/0054046 A1 | 12/2001 | Mikhailov et al. | 707/500 |
| 2002/0029273 A1 | 3/2002 | Haroldson et al. | 709/226 |
| 2002/0038217 A1 | 3/2002 | Young | 705/1 |
| 2002/0049621 A1 | 4/2002 | Bruce | 705/7 |
| 2002/0052740 A1 | 5/2002 | Charlesworth | 704/243 |
| 2002/0052862 A1 | 5/2002 | Scott et al. | 707/1 |
| 2002/0059267 A1 | 5/2002 | Shah | 707/100 |
| 2002/0078175 A1 | 6/2002 | Wallace | 709/200 |
| 2002/0087272 A1 | 7/2002 | Mackie | 702/14 |
| 2002/0091737 A1 | 7/2002 | Markel | 707/513 |

| Pub. No. | Date | Inventor | Class |
|---|---|---|---|
| 2002/0099578 A1 | 7/2002 | Eicher et al. | 705/7 |
| 2002/0099678 A1 | 7/2002 | Albright et al. | 706/45 |
| 2002/0103976 A1 | 8/2002 | Steely et al. | 711/135 |
| 2002/0112171 A1 | 8/2002 | Ginter et al. | 713/185 |
| 2002/0133368 A1 | 9/2002 | Strutt et al. | 705/1 |
| 2002/0147803 A1 | 10/2002 | Dodd et al. | 709/223 |
| 2002/0161614 A1 | 10/2002 | Spira et al. | 705/7 |
| 2002/0169658 A1 | 11/2002 | Adler | 705/10 |
| 2002/0169799 A1 | 11/2002 | Voshell | 707/503 |
| 2002/0177784 A1 | 11/2002 | Shekhar | 600/519 |
| 2002/0178119 A1 | 11/2002 | Griffin et al. | 705/54 |
| 2002/0184043 A1 | 12/2002 | Lavorgna et al. | 705/1 |
| 2002/0184061 A1 | 12/2002 | Digate et al. | 705/7 |
| 2002/0188513 A1 | 12/2002 | Gil et al. | 705/22 |
| 2002/0194042 A1 | 12/2002 | Sands | 705/7 |
| 2002/0194090 A1 | 12/2002 | Gagnon et al. | 705/27 |
| 2002/0194329 A1 | 12/2002 | Alling | 709/224 |
| 2002/0198985 A1 | 12/2002 | Fraenkel et al. | 709/224 |
| 2003/0004742 A1 | 1/2003 | Palmer et al. | 705/1 |
| 2003/0014290 A1 | 1/2003 | McLean et al. | 705/7 |
| 2003/0014488 A1 | 1/2003 | Dalal et al. | 709/204 |
| 2003/0028419 A1 | 2/2003 | Monaghan | 705/10 |
| 2003/0033191 A1 | 2/2003 | Davies et al. | 705/10 |
| 2003/0040936 A1 | 2/2003 | Nader et al. | 705/1 |
| 2003/0055731 A1 | 3/2003 | Fouraker et al. | 705/22 |
| 2003/0055927 A1 | 3/2003 | Fischer et al. | 709/221 |
| 2003/0061132 A1 | 3/2003 | Yu et al. | 705/30 |
| 2003/0065604 A1 | 4/2003 | Gatto | 705/36 |
| 2003/0065605 A1 | 4/2003 | Gatto | 705/36 |
| 2003/0069773 A1 | 4/2003 | Hladik et al. | 705/7 |
| 2003/0069824 A1 | 4/2003 | Menninger | 705/37 |
| 2003/0071814 A1 | 4/2003 | Jou et al. | 345/440 |
| 2003/0078830 A1 | 4/2003 | Wagner et al. | |
| 2003/0093423 A1 | 5/2003 | Larason et al. | 707/5 |
| 2003/0110249 A1 | 6/2003 | Buus et al. | 709/224 |
| 2003/0144868 A1 | 7/2003 | MacIntyre et al. | 705/1 |
| 2003/0146937 A1 | 8/2003 | Lee | 345/781 |
| 2003/0149696 A1 | 8/2003 | Nelson et al. | |
| 2003/0182181 A1 | 9/2003 | Kirkwood | 705/11 |
| 2003/0187675 A1 | 10/2003 | Hack | 705/1 |
| 2003/0195878 A1 | 10/2003 | Neumann | 707/3 |
| 2003/0204430 A1 | 10/2003 | Kalmick et al. | 705/8 |
| 2003/0204487 A1 | 10/2003 | Sssv | 707/1 |
| 2003/0212960 A1 | 11/2003 | Shaughnessy et al. | 715/526 |
| 2003/0225604 A1 | 12/2003 | Casati et al. | 705/7 |
| 2003/0226107 A1 | 12/2003 | Pelegri-Llopart | 707/501.1 |
| 2003/0236732 A1 | 12/2003 | Cimral et al. | 705/36 |
| 2004/0021695 A1 | 2/2004 | Sauermann et al. | 345/789 |
| 2004/0030741 A1 | 2/2004 | Wolton et al. | 709/202 |
| 2004/0030795 A1 | 2/2004 | Hesmer et al. | 709/231 |
| 2004/0033475 A1 | 2/2004 | Mizuma et al. | 434/219 |
| 2004/0044665 A1 | 3/2004 | Nwabueze | 707/9 |
| 2004/0044678 A1* | 3/2004 | Kalia et al. | 707/102 |
| 2004/0059518 A1 | 3/2004 | Rothschild | 702/18 |
| 2004/0064293 A1 | 4/2004 | Hamilton et al. | 702/182 |
| 2004/0066782 A1 | 4/2004 | Nassar | 370/389 |
| 2004/0068429 A1 | 4/2004 | MacDonald | 705/10 |
| 2004/0068431 A1 | 4/2004 | Smith et al. | 705/10 |
| 2004/0083246 A1 | 4/2004 | Kahlouche et al. | 708/105 |
| 2004/0093296 A1 | 5/2004 | Phelan et al. | 705/36 R |
| 2004/0102926 A1 | 5/2004 | Adendorff | 702/182 |
| 2004/0117731 A1 | 6/2004 | Blyashov | 715/507 |
| 2004/0119752 A1 | 6/2004 | Berringer et al. | 345/779 |
| 2004/0128150 A1 | 7/2004 | Lundegren | 705/1 |
| 2004/0135826 A1 | 7/2004 | Pickering | 345/860 |
| 2004/0138944 A1 | 7/2004 | Whitacre | 705/11 |
| 2004/0162772 A1 | 8/2004 | Lewis | 705/34 |
| 2004/0164983 A1 | 8/2004 | Khozai | 345/440 |
| 2004/0172323 A1 | 9/2004 | Stamm | 705/10 |
| 2004/0183800 A1 | 9/2004 | Peterson | 345/440 |
| 2004/0199541 A1 | 10/2004 | Goldberg et al. | 707/104.1 |
| 2004/0204913 A1 | 10/2004 | Mueller et al. | 702/188 |
| 2004/0210574 A1 | 10/2004 | Aponte et al. | 707/5 |
| 2004/0212636 A1 | 10/2004 | Stata et al. | 345/703 |
| 2004/0215626 A1 | 10/2004 | Colossi et al. | 715/500 |
| 2004/0225571 A1 | 11/2004 | Urali | 705/26 |
| 2004/0225955 A1 | 11/2004 | Ly | 715/500 |
| 2004/0230463 A1 | 11/2004 | Boivin | 705/7 |
| 2004/0230471 A1 | 11/2004 | Putnam | 705/10 |
| 2004/0249482 A1 | 12/2004 | Abu El Ata et al. | 700/44 |
| 2004/0249657 A1 | 12/2004 | Koi et al. | 705/1 |
| 2004/0252134 A1 | 12/2004 | Bhatt et al. | 345/619 |
| 2004/0254806 A1 | 12/2004 | Schwerin-Wenzel et al. | 705/1 |
| 2004/0254860 A1 | 12/2004 | Wagner et al. | 705/27 |
| 2004/0260582 A1 | 12/2004 | King | 705/7 |
| 2004/0260717 A1* | 12/2004 | Albornoz et al. | 707/102 |
| 2004/0268228 A1 | 12/2004 | Croney et al. | 715/255 |
| 2005/0004781 A1 | 1/2005 | Price et al. | 702/188 |
| 2005/0012743 A1 | 1/2005 | Kapler et al. | 345/419 |
| 2005/0039119 A1 | 2/2005 | Parks et al. | 715/515 |
| 2005/0049831 A1 | 3/2005 | Lilly | 702/182 |
| 2005/0049894 A1 | 3/2005 | Cantwell et al. | 705/1 |
| 2005/0055257 A1 | 3/2005 | Senturk et al. | 705/8 |
| 2005/0060048 A1 | 3/2005 | Pierre | 700/28 |
| 2005/0060300 A1 | 3/2005 | Stolte et al. | |
| 2005/0060325 A1 | 3/2005 | Bakalash | 707/100 |
| 2005/0065925 A1 | 3/2005 | Weissman et al. | 707/4 |
| 2005/0065930 A1 | 3/2005 | Swaminathan et al. | |
| 2005/0065967 A1 | 3/2005 | Schuetze et al. | 707/102 |
| 2005/0071680 A1 | 3/2005 | Bukary et al. | 713/201 |
| 2005/0071737 A1 | 3/2005 | Adendorff | 715/500 |
| 2005/0091093 A1 | 4/2005 | Bhaskaran | 705/7 |
| 2005/0091253 A1* | 4/2005 | Cragun et al. | 707/102 |
| 2005/0091263 A1 | 4/2005 | Wallace | 707/102 |
| 2005/0097438 A1 | 5/2005 | Jacobson | 715/500.1 |
| 2005/0097517 A1 | 5/2005 | Goin et al. | 717/124 |
| 2005/0108271 A1 | 5/2005 | Hurmiz et al. | 707/102 |
| 2005/0114241 A1 | 5/2005 | Hirsch | 705/35 |
| 2005/0114801 A1 | 5/2005 | Yang | 715/961 |
| 2005/0144022 A1 | 6/2005 | Evans | 705/1 |
| 2005/0149558 A1 | 7/2005 | Zhuk | 707/104.1 |
| 2005/0149852 A1 | 7/2005 | Bleicher | 715/501.1 |
| 2005/0154628 A1 | 7/2005 | Eckart | 705/10 |
| 2005/0154635 A1 | 7/2005 | Wright et al. | 705/11 |
| 2005/0154769 A1 | 7/2005 | Eckart et al. | 707/201 |
| 2005/0160356 A1 | 7/2005 | Albornoz | 707/203 |
| 2005/0171835 A1 | 8/2005 | Mook | 705/11 |
| 2005/0181835 A1 | 8/2005 | Lau et al. | 455/567 |
| 2005/0197946 A1 | 9/2005 | Williams et al. | 705/36 |
| 2005/0198042 A1 | 9/2005 | Davis | 707/10 |
| 2005/0203876 A1* | 9/2005 | Cragun et al. | 707/3 |
| 2005/0209943 A1 | 9/2005 | Ballow et al. | 705/35 |
| 2005/0209945 A1 | 9/2005 | Ballow et al. | 705/35 |
| 2005/0209946 A1 | 9/2005 | Ballow et al. | 705/35 |
| 2005/0209948 A1 | 9/2005 | Ballow et al. | 705/36 |
| 2005/0210052 A1 | 9/2005 | Aldridge | 707/101 |
| 2005/0216831 A1 | 9/2005 | Guzik | 715/513 |
| 2005/0228880 A1 | 10/2005 | Champlin | 709/224 |
| 2005/0240467 A1 | 10/2005 | Eckart | 705/10 |
| 2005/0240898 A1 | 10/2005 | Manikotia et al. | 717/101 |
| 2005/0256825 A1 | 11/2005 | Dettinger | 715/512 |
| 2005/0262051 A1* | 11/2005 | Dettinger et al. | 707/3 |
| 2005/0262451 A1 | 11/2005 | Remignanti et al. | 715/833 |
| 2005/0272022 A1 | 12/2005 | Montz, Jr. et al. | 434/322 |
| 2005/0273762 A1 | 12/2005 | Lesh | 715/115 |
| 2005/0289452 A1 | 12/2005 | Kashi | 715/512 |
| 2006/0004555 A1 | 1/2006 | Jones | 703/6 |
| 2006/0004731 A1 | 1/2006 | Seibel et al. | 707/3 |
| 2006/0009990 A1 | 1/2006 | McCormick | 705/1 |
| 2006/0010032 A1 | 1/2006 | Eicher et al. | 705/10 |
| 2006/0010164 A1 | 1/2006 | Netz et al. | 707/104.1 |
| 2006/0020531 A1 | 1/2006 | Veeneman et al. | 705/35 |
| 2006/0026179 A1 | 2/2006 | Brown et al. | 707/100 |
| 2006/0036455 A1 | 2/2006 | Prasad | 715/1 |
| 2006/0036595 A1 | 2/2006 | Gilfix et al. | 707/5 |
| 2006/0047419 A1 | 3/2006 | Diendorf et al. | 701/208 |
| 2006/0059107 A1 | 3/2006 | Elmore et al. | 705/64 |
| 2006/0074789 A1 | 4/2006 | Capotosto et al. | 705/35 |
| 2006/0080156 A1 | 4/2006 | Baughn et al. | 705/7 |
| 2006/0085444 A1 | 4/2006 | Sarawgi et al. | 707/100 |
| 2006/0089868 A1 | 4/2006 | Griller et al. | 705/10 |
| 2006/0089894 A1 | 4/2006 | Balk et al. | 705/35 |
| 2006/0089939 A1 | 4/2006 | Broda et al. | 707/100 |
| 2006/0095276 A1 | 5/2006 | Axelrod et al. | 705/1 |
| 2006/0095915 A1 | 5/2006 | Clater | 718/100 |
| 2006/0111921 A1 | 5/2006 | Chang et al. | 705/1 |
| 2006/0112123 A1 | 5/2006 | Clark et al. | 707/101 |
| 2006/0112130 A1 | 5/2006 | Lowson | 707/102 |

| | | | |
|---|---|---|---|
| 2006/0123022 A1 | 6/2006 | Bird | 707/100 |
| 2006/0136830 A1 | 6/2006 | Martlage et al. | 715/745 |
| 2006/0154692 A1 | 7/2006 | Ikehara et al. | 455/556.2 |
| 2006/0161471 A1 | 7/2006 | Hulen et al. | 705/10 |
| 2006/0161596 A1 | 7/2006 | Chan et al. | 707/201 |
| 2006/0167704 A1 | 7/2006 | Nicholls et al. | 705/1 |
| 2006/0178897 A1 | 8/2006 | Fuchs | 705/1 |
| 2006/0178920 A1 | 8/2006 | Muell | 705/8 |
| 2006/0195424 A1 | 8/2006 | Wiest et al. | 707/3 |
| 2006/0206392 A1 | 9/2006 | Rice, Jr. et al. | 705/26 |
| 2006/0224325 A1 | 10/2006 | Conway et al. | 702/19 |
| 2006/0229925 A1 | 10/2006 | Chalasani et al. | 705/8 |
| 2006/0230234 A1 | 10/2006 | Bentolila et al. | 711/133 |
| 2006/0233348 A1 | 10/2006 | Cooper | 379/265.06 |
| 2006/0235732 A1 | 10/2006 | Miller et al. | 705/7 |
| 2006/0235778 A1 | 10/2006 | Razvi et al. | 705/35 |
| 2006/0253475 A1 | 11/2006 | Stewart et al. | 707/100 |
| 2006/0259338 A1 | 11/2006 | Rodrigue et al. | 705/7 |
| 2006/0265377 A1 | 11/2006 | Raman et al. | 707/9 |
| 2006/0271583 A1 | 11/2006 | Hulen et al. | 707/102 |
| 2006/0277128 A1 | 12/2006 | Anandarao et al. | |
| 2006/0282819 A1* | 12/2006 | Graham et al. | 717/113 |
| 2006/0288211 A1 | 12/2006 | Vargas et al. | 713/170 |
| 2007/0021992 A1 | 1/2007 | Konakalla | 705/7 |
| 2007/0022026 A1 | 1/2007 | Davidson et al. | 705/31 |
| 2007/0033129 A1 | 2/2007 | Coates | 705/36 R |
| 2007/0038934 A1 | 2/2007 | Fellman | 715/700 |
| 2007/0050237 A1 | 3/2007 | Tien et al. | 705/11 |
| 2007/0055564 A1 | 3/2007 | Fourman | 705/11 |
| 2007/0055688 A1 | 3/2007 | Blattner | 707/102 |
| 2007/0067381 A1 | 3/2007 | Grant et al. | 709/200 |
| 2007/0112607 A1 | 5/2007 | Tien et al. | 705/7 |
| 2007/0143161 A1 | 6/2007 | Tien et al. | 705/7 |
| 2007/0143174 A1 | 6/2007 | Tien et al. | 705/11 |
| 2007/0143175 A1 | 6/2007 | Tien et al. | 705/11 |
| 2007/0156680 A1 | 7/2007 | Tien et al. | 707/6 |
| 2007/0168323 A1 | 7/2007 | Dickerman et al. | 707/2 |
| 2007/0174330 A1 | 7/2007 | Fox et al. | 707/102 |
| 2007/0225986 A1 | 9/2007 | Bowe et al. | 705/1 |
| 2007/0239508 A1 | 10/2007 | Fazal et al. | 705/8 |
| 2007/0239573 A1 | 10/2007 | Tien et al. | 705/35 |
| 2007/0239660 A1 | 10/2007 | Tien et al. | 707/2 |
| 2007/0254740 A1 | 11/2007 | Tien et al. | 463/42 |
| 2007/0255681 A1 | 11/2007 | Tien et al. | 707/2 |
| 2007/0260625 A1 | 11/2007 | Tien et al. | 707/101 |
| 2007/0265863 A1 | 11/2007 | Tien et al. | 705/1 |
| 2007/0266042 A1 | 11/2007 | Hsu et al. | 707/102 |
| 2007/0282673 A1 | 12/2007 | Nagpal et al. | 705/11 |
| 2008/0005064 A1* | 1/2008 | Sarukkai | 707/3 |
| 2008/0040309 A1 | 2/2008 | Aldridge | 707/1 |
| 2008/0059441 A1 | 3/2008 | Gaug et al. | 707/4 |
| 2008/0086345 A1 | 4/2008 | Wilson et al. | 705/7 |
| 2008/0086359 A1 | 4/2008 | Holton et al. | 705/10 |
| 2008/0109270 A1 | 5/2008 | Shepherd et al. | 705/7 |
| 2008/0115103 A1 | 5/2008 | Datars et al. | 717/101 |
| 2008/0140623 A1 | 6/2008 | Tien et al. | 707/3 |
| 2008/0162209 A1 | 7/2008 | Gu et al. | 705/7 |
| 2008/0162210 A1 | 7/2008 | Gu et al. | 705/7 |
| 2008/0163066 A1 | 7/2008 | Gu et al. | 715/738 |
| 2008/0163099 A1 | 7/2008 | Gu et al. | 715/780 |
| 2008/0163125 A1 | 7/2008 | Gu et al. | 715/853 |
| 2008/0163164 A1 | 7/2008 | Chowdhary et al. | 717/106 |
| 2008/0168376 A1 | 7/2008 | Tien et al. | 715/772 |
| 2008/0172287 A1 | 7/2008 | Tien et al. | 705/10 |
| 2008/0172348 A1 | 7/2008 | Tien et al. | 706/12 |
| 2008/0172414 A1 | 7/2008 | Tien et al. | 707/104.1 |
| 2008/0172629 A1 | 7/2008 | Tien et al. | 715/771 |
| 2008/0183564 A1 | 7/2008 | Tien et al. | 705/11 |
| 2008/0184099 A1 | 7/2008 | Tien et al. | 715/209 |
| 2008/0184130 A1 | 7/2008 | Tien et al. | 715/745 |
| 2008/0189632 A1 | 8/2008 | Tien et al. | 715/764 |
| 2008/0189724 A1 | 8/2008 | Tien et al. | 719/329 |
| 2008/0243597 A1 | 10/2008 | Ballow et al. | 705/11 |
| 2008/0288889 A1 | 11/2008 | Hunt et al. | 705/810 |
| 2009/0300110 A1 | 12/2009 | Chene et al. | 709/203 |
| 2010/0262659 A1* | 10/2010 | Christiansen et al. | 709/205 |
| 2012/0150905 A1 | 6/2012 | Tien et al. | |

FOREIGN PATENT DOCUMENTS

| | | |
|---|---|---|
| EP | 1 050 829 A2 | 3/2006 |
| WO | WO 97/031320 A1 | 8/1997 |
| WO | WO 01/01206 A2 | 1/2001 |
| WO | WO 01/01206 A3 | 1/2001 |
| WO | WO 01/65349 A1 | 9/2001 |
| WO | WO 01/69421 A2 | 9/2001 |
| WO | WO 01/69421 A3 | 9/2001 |
| WO | WO 03/037019 A1 | 5/2003 |
| WO | WO 2004/114177 A2 | 12/2004 |
| WO | WO 2004/114177 A3 | 12/2004 |
| WO | WO 2005101233 | 10/2005 |

OTHER PUBLICATIONS

U.S. Official Action mailed May 28, 2009 in U.S. Appl. No. 11/280,548.

U.S. Official Action mailed May 28, 2009 in U.S. Appl. No. 11/214,678.

U.S. Official Action mailed Jun. 19, 2009 in U.S. Appl. No. 11/408,450.

U.S. Official Action mailed Aug. 6, 2009 in U.S. Appl. No. 11/668,520.

U.S. Official Action mailed Aug. 19, 2009 in U.S. Appl. No. 11/393,115.

U.S. Official Action mailed Sep. 1, 2009 in U.S. Appl. No. 11/412,434.

U.S. Official Action mailed Sep. 2, 2009 in U.S. Appl. No. 11/624,171.

U.S. Official Action mailed Sep. 30, 2009 in U.S. Appl. No. 11/214,678.

Kraynak, "Absolute Beginner's Guide to Microsoft Office Excel 2003", Que, Sep. 2003, 32 pp.

John Wiley et al., "Power Point All-in-One Desk Reference for Dummies," Jan. 10, 2007.

U.S. Official Action mailed Oct. 21, 2009 in U.S. Appl. No. 11/280,548.

U.S. Official Action mailed Dec. 14, 2009 in U.S. Appl. No. 11/393,019.

U.S. Official Action mailed Dec. 28, 2009 in U.S. Appl. No. 11/624,171.

U.S. Official Action mailed Jan. 15, 2010 in U.S. Appl. No. 11/408,450.

IndicatorBarometer; retrieved from <http://www.aiqsystems.com/docs/ref_7.pdf>, archived Oct. 15, 2004.

U.S. Official Action mailed Jan. 22, 2010 in U.S. Appl. No. 11/039,714.

U.S. Official Action mailed Feb. 3, 2010 in U.S. Appl. No. 11/668,530.

Chien et al., XML Document Versioning, SIGMOD Record, vol. 30, No. 3, Sep. 2001.

U.S. Official Action mailed Mar. 17, 2010 in U.S. Appl. No. 11/280,548.

U.S. Official Action mailed Mar. 25, 2010 in U.S. Appl. No. 11/393,115.

U.S. Official Action mailed Mar. 30, 2010 in U.S. Appl. No. 11/313,390.

U.S. Official Action mailed Mar. 31, 2010 in U.S. Appl. No. 11/313,327.

U.S. Official Action mailed Apr. 1, 2010 in U.S. Appl. No. 11/313,899.

U.S. Official Action mailed Apr. 7, 2010 in U.S. Appl. No. 11/412,499.

U.S. Official Action mailed May 26, 2010 in U.S. Appl. No. 11/668,520.

Cognos Incorporated, "Scorecarding with Cognos Metrics Manager," Oct. 2004.

Charles Bloomfield, "Bringing the Balanced Scorecard to Life: The Microsoft Balanced Scorecard Framework," Microsoft Corporation White Paper, May 2002.

Mulins, Craig S., "Distributed Query Optimization Technical Support", Jul. 1996.

Callen, Daniel J. et al., "Consolidation of Query Results in a Multidatabase Environment: An Object Oriented Approach" IEEE, 1996.
U.S. Official Action mailed Apr. 14, 2010 in U.S. Appl. No. 11/313,324.
U.S. Official Action mailed Apr. 15, 2010 in U.S. Appl. No. 11/412,458.
U.S. Official Action mailed Apr. 23, 2010 in U.S. Appl. No. 11/214,678.
U.S. Official Action mailed May 12, 2010 in U.S. Appl. No. 11/624,171.
Ergometrics.com Web Pages, Ergometrics, Feb.-Mar. 2000, Retrieved from Archive.org Jan. 25, 2007.
Arnold, Tom, Dashboard & Scorecard Software—Tools for Operations Management and Strategy Deployment, Sep. 18, 2002.
iDashes.net Web Pages, iDashes, Inc., May 2001, Retrieved from Archive.org Jan. 25, 2007.
IBM WebSphere: Chapter 6—Working with WebSphere Business Modeler, cited in U.S. Appl. No. 11/313,390 in OA dated Sep. 1, 2010, 20 pgs.
U.S. Official Action mailed Aug. 4, 2010 in U.S. Appl. No. 11/280,548.
U.S. Official Action mailed Aug. 5, 2010 in U.S. Appl. No. 11/412,458.
U.S. Official Action mailed Aug. 10, 2010 in U.S. Appl. No. 11/623,818.
U.S. Official Action mailed Aug. 30, 2010 in U.S. Appl. No. 11/313,327.
U.S. Official Action mailed Sep. 1, 2010 in U.S. Appl. No. 11/313,390.
U.S. Official Action mailed Jul. 21, 2010 in U.S. Appl. No. 11/039,714.
U.S. Official Action mailed Sep. 8, 2010 in U.S. Appl. No. 11/670,516.
U.S. Official Action mailed Sep. 9, 2010 in U.S. Appl. No. 11/412,499.
U.S. Official Action mailed Sep. 29, 2010 in U.S. Appl. No. 11/313,324.
U.S. Official Action mailed Oct. 6, 2010 in U.S. Appl. No. 11/313,899.
U.S. Official Action mailed Oct. 12, 2010 in U.S. Appl. No. 11/623,953.
Monson et al., "IBM Workplace for Business Controls and Reporting: Administration and Operations Best Practices", IBM Redpaper, Oct. 2005, pp. 1-240.
"Cognos Business Intelligence Series 7, Cognos Impromptu (2006), Mastering Impromptu Reports", Cognos Incorporated, pp. 1-154.
"Cognos Series 7 PowerPlay Transformer", (2003), Installation Guide, Cognos Incorporated, pp. 1-62.
"Cognos Business Intelligence Series Cognos PowerPlay for Windows (2006), Discovering PowerPlay", Cognos Incorporated, pp. 1-74.
"Cognos Business Intelligence Series 7 PowerPlay for Windows", (2006), PowerPlay User Guide, Cognos Incorporated, pp. 1-230.
"Epicor Vantage: Introducing the Next Generation Global Enterprise Resource Planning Software", Epicore Vantage, http://m.scala.com.cn`downloads/vantage/vantage6Oage.pdf, printed Jan. 12, 2006, 60 pgs.
T. E. Graedel et al., "Hierarchical Metrics for Sustainability", Environmental Quality Management, Winter, 2002, vol. 12 Issue 12, pp. 21-30, Retrieved from Business Source Complete Database.
U.S. Official Action mailed Nov. 10, 2010 in U.S. Appl. No. 11/624,122.
U.S. Official Action mailed Nov. 10, 2010 in U.S. Appl. No. 11/668,763.
U.S. Official Action mailed Nov. 24, 2010 in U.S. Appl. No. 11/670,444.
U.S. Official Action mailed Nov. 29, 2010 in U.S. Appl. No. 11/668,520.
U.S. Official Action mailed Dec. 8, 2010 in U.S. Appl. No. 11/214,678.
"SYSPRO Offers Executive Dashboard with SYSPRO e.net Solutions"; Business Wire, Oct. 11, 2004.
Park et al., Role-Based Access Control on the Web; ACM Transactions on Information and System Security, vol. 4, No. 1, Feb. 2001.
"Microsoft Office Business Scorecard Manager"; Microsoft, 2003.
"Microsoft Takes Up Scorecarding; Performance Management app aims to Maximize Office"; eWeek, Oct. 31, 2005.
Tedeschi, Digital Cockpits are a Faster, Much Closer Way of Tracking Performance in a Corporation's Every Corner; New York Times, Jul. 29, 2002.
Havenstein; "BI Reporting Tools Improve"; InfoWorld, vol. 25, No. 45, Nov. 17, 2003.
U.S. Official Action mailed Jan. 6, 2011 in U.S. Appl. No. 11/313,324.
U.S. Official Action mailed Jan. 11, 2011 in U.S. Appl. No. 11/412,458.
U.S. Official Action mailed Jan. 25, 2011 in U.S. Appl. No. 11/280,548.
U.S. Official Action mailed Feb. 1, 2011 in U.S. Appl. No. 11/670,516.
U.S. Official Action mailed Mar. 1, 2011 in U.S. Appl. No. 11/412,499.
U.S. Official Action mailed Mar. 2, 2011 in U.S. Appl. No. 11/624,122.
U.S. Official Action mailed Mar. 4, 2011 in U.S. Appl. No. 11/668,763.
U.S. Official Action mailed Jul. 6, 2011 in U.S. Appl. No. 11/214,678.
U.S. Official Action mailed Jul. 14, 2011 in U.S. Appl. No. 11/668,763.
U.S. Official Action mailed Aug. 8, 2011 in U.S. Appl. No. 11/313,324.
U.S. Official Action mailed Apr. 1, 2011 in U.S. Appl. No. 11/313,899.
U.S. Official Action mailed Apr. 4, 2011 in U.S. Appl. No. 11/624,171.
U.S. Official Action mailed Apr. 12, 2011 in U.S. Appl. No. 11/623,953.
U.S. Official Action mailed May 18, 2011 in U.S. Appl. No. 11/670,444.
U.S. Official Action mailed May 23, 2011 in U.S. Appl. No. 11/623,818.
U.S. Official Action mailed Jun. 7, 2011 in U.S. Appl. No. 11/670,516.
U.S. Official Action mailed Jun. 13, 2011 in U.S. Appl. No. 11/668,520.
U.S. Official Action mailed Jun. 21, 2011 in U.S. Appl. No. 11/408,450.
U.S. Official Action mailed Jun. 24, 2011 in U.S. Appl. No. 11/280,548.
"Business Analysis with OLAP", Netways, http://www.netways.com/newsletter.olap.html, printed Mar. 7, 2006, 3 pp.
"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.
"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.
"Cognos 8 Business Intelligence Overview", Cognos Incorporated, http://www.cognos.com/products/cognos8businessintelligence/index.html, printed Jan. 11, 2006, 1 pp.
"CorVu Products", Seabrook, http://www.seabrook.ie/corvu.htm#corvurapidscorecard, printed Mar. 7, 2006, 3 pp.
"Enhanced Vendor Scorecards Vendor Documentation", Publix Super Markets, Inc., copyright 2003, revised date Feb. 9, 2004, http://my.datexx.com/www/customer/p14/Vendor%20EVS%20Documentation.pdf, 25 pp.
"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.

"Extend Business Scorecard Manager 2005", ProClarity, http://www.proclarity.com/products/clients_scorecardmanager.asp, printed Jan. 11, 2006, 2 pp.

"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.

"MicroStrategy: Best in Business Intelligence", MicroStrategy Inc., http://www.microstrategy.com/Software/Products/User-Interfaces/Web, printed Jan. 11, 2006, 3 pp.

"OutlookSoft CPM: A Unified Corporate Performance Management Solution", OutlookSoft Corporation, http://www.outlooksoft.com/product.index.htm, printed Jan. 11, 2006, 2 pp.

"SBM Solutions: Product Guide", SBM Associates, http://www.productcosting.com/prodguide.htm, printed Feb. 28, 2006, 1 pp.

"Scorecarding with Cognos® Metrics Manager", Cognos, http://www.cognos.com/pdfs/factsheets/fs_scorcarding_with_cognos_metrics_manager.pdf, printed Mar. 7, 2006, 4 pp.

"The Balanced Scorecard", http://cc.msncache.com/cache.aspx?q=2846702033267&lang=en-US&mkt=en-US&FORM=CVRE3, 4 pp., Jul. 2005.

Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.

Bajwa, Deepinder S. et al., "An Empirical Assessment of the Adoption and Use of Collaboration Information Technologies in the U.S., Australia, and Hong Kong", http://dsslab.sims.monash.edu,au/dss2004/proceedings/pdf/07_Bajwa_Lewis_Pervan_Lai.pdf, printed Jan. 12, 2006, copyright 2004, pp. 60-69.

Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.

Elmanova, Natalia, "Implementing OLAP in Delphi Applications", http://www.only4gurus.net/miscellaneous/implementing_olap_in_delphi_a.doc, printed Mar. 6, 2006, 19 pp.

Ferguson, Mike, "Conquering CPM and Business Intelligence", Business Intelligence.com, ITNews265, http://www.businessintelligence.com/ex/asp.code.21/xe/article.htm, printed Jan. 11, 2006, 6 pp.

Sanders, Paul, "SQL Server 2005: Real-Time Business Intelligence Using Analysis Services", Microsoft Corporation, Apr. 1, 2005, http://www.microsoft.com/technet/prodtechnol/sql/2005/rtbissas.mspx, printed Jan. 11, 2006, 9 pp.

U.S. Appl. No. 11/039,714, filed Jan. 1, 2005 entitled "System and Method for Multi-Dimensional Average-Weighted Banding Status and Scoring".

U.S. Appl. No. 11/214,678, filed Aug. 30, 2005 entitled "Visual Designer for Multi-Dimensional Business Logic".

U.S. Appl. No. 11/280,548, filed Nov. 16, 2005 entitled "Score-Based Alerting in Business Logic".

U.S. Appl. No. 11/313,324, filed Dec. 21, 2005 entitled "Application Independent Rendering of Scorecard Metrics".

U.S. Appl. No. 11/313,327, filed Dec. 21, 2005 entitled "Repeated Inheritance of Heterogeneous Business Metrics".

U.S. Appl. No. 11/313,390, filed Dec. 21, 2005 entitled "Disconnected Authoring of Business Definitions".

U.S. Appl. No. 11/313,899, filed Dec. 21, 2005 entitled "Centralized Model for Coordinating Update of Multiple Reports".

U.S. Appl. No. 11/393,019, filed Mar. 30, 2006 entitled "Automated Generation of Dashboards for Scorecard Metrics and Subordinate Reporting".

U.S. Appl. No. 11/393,115, filed Mar. 30, 2006 entitled "Definition and Instantiation of Metric Based Business Logic Reports".

U.S. Appl. No. 11/408,450, filed Apr. 21, 2006 entitled "Grouping and Display of Logically Defined Reports".

U.S. Appl. No. 11/412,434, filed Apr. 27, 2006 entitled "Multidimensional Scorecard Header Definition".

U.S. Appl. No. 11/412,458, filed Apr. 27, 2006 entitled "Concerted Coordination of Multi-Dimensional Scorecards".

U.S. Appl. No. 11/412,499, filed Apr. 27, 2006 entitled "Automated Determination of Relevant Slice in Multidimensional Data Sources".

Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.

Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.

"Data Driven Components," Java Developers Journal, SYS-CON Media, Inc. 2004, http://www2.sys-con.com/itsg/virtualcd/Java/archives/0405/hyrkas/index.html, 7 pp.

"Hyperion Intelligence Desktop, Plugin, and HTML Client Products," Hyperion™ Developer Network, http://dev.hyperion.com/resource_library/articles/intelligence_desktop_article.cfm, 7 pp., Oct. 20, 2006.

"BusinessObjects Enterprise 6," An End-to-End Overview, White Paper., http://www.spain.businessobjects.com/global/pdf/products/queryanalysis/wp_e6_overview.pdf, 20 pp., 2003.

"Cognos 8 Business Intelligence—Dashboards," COGNOS® The Next Level of Performance, http://www.cognos.com/products/cognos8businessintelligence/dashboards.html, 2 pp., Oct. 20, 2006.

"Microsoft Builds Business Intelligence Into Office Software," Microsoft PressPass—Information for Journalists, http://www.microsoft.com/presspass/press/2005/oct05/10-23BiLaunchPR.mspx, 4 pp., Oct. 20, 2006.

"Hyperion System 9 BI+Enterprise Metrics," A Hyperion Data Sheet, Hyperion Solutions Corporation Worldwide Headquarters, Oct. 2006, http://www.hyperion.com/products/resource_library/product_collateral/EnterpriseMetrics.pdf, pp. 1-2.

"Products: PilotWorks," Products: PilotWorks—Scorecard, 2006 Pilot Software, pp. 1-3.

"Reveleus Business Analytics," Reveleus, an i-flex businedss, pp. 1-4, 2002.

Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp., 2003.

"Crystal Xcelsius Workgroup." http://www.xcelsius.com/Products/Enterprise_feastures.html, 3 pp., Oct. 31, 2006.

"Reporting and Dashboards with Cognos 8 Business Intelligence," Cognos, The Next Level of Intelligence, http://www.cognos.com/pdfs/whitepapers/wp_reporting_and_dashboards_with_c8bi.pdf , pp. 1-16, Oct. 9, 2007.

"BusinessObjects Plan Dashboarding XI for Retail," BusinessObjects, http://www.businessobjects.com/pdf/products/planning/plan_dashboarding_rt.pdf, 2 pp., 2006.

"SAS® Risk Intelligence Offerings, Risk Reporting; Data Integration; Internal Risk Ratings; Credit Risk; Market Risk; Operational Risk", http://www.sas.com/industry/fsi/risk/brochure2.pdf, 12 pp., 2006.

Tenhunen, Jarkko; Ukko, Juhani; Markus, Tapio; Rantanen, Hannu; "Applying Balanced Scorecard Principles on the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp., 2003.

Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp.

Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20scorecard.pdf, 18 pp.

U.S. Office Action mailed Jul. 25, 2008 cited in U.S. Appl. No. 11/412,434.

U.S. Office Action mailed Sep. 5, 2008 cited in U.S. Appl. No. 11/280,548.
U.S. Office Action dated Nov. 24, 2008 cited in U.S. Appl. No. 11/214,678.
U.S. Official Action mailed Nov. 8, 2011 in U.S. Appl. No. 11/670,516.
U.S. Official Action mailed Nov. 9, 2011 in U.S. Appl. No. 11/623,818.
U.S. Official Action mailed Nov. 10, 2011 in U.S. Appl. No. 11/627,640.
U.S. Official Action mailed Nov. 28, 2011 in U.S. Appl. No. 11/668,763.
U.S. Official Action mailed Dec. 1, 2011 in U.S. Appl. No. 11/670,444.
U.S. Official Action mailed Dec. 12, 2011 in U.S. Appl. No. 11/313,899.
U.S. Official Action mailed Jan. 4, 2012 in U.S. Appl. No. 11/280,548.
Multidimensional Data Integration of Protein Annotations http://www.springerlink.com/(3riocx450rr2iv55x2txum55)/app/home/contribution.asp?referrer=parent&backto=issue,11,15;journal,827,2337;linkingpublicationresults,1:105633,1, 2004.
Lebow, Ph.D., David G.; Lick, Ph.D., Dale W., "HyLighter: An Effective Interactive Annotation Innovation for Distance Education", http://www.uwex.edu/disted/conference/Resource_library/proceedings/04_1344.pdf, 2005.
Bird, Steven; Liberman, Mark, "Annotation Graphs as a Framwork for Multidimensional Linguistic Data Analysis", Linguistic Data Consortium, University of Pennsylvania. http://acl.ldc.upenn.edu/W/W99/W99-0301.pdf, 1999.
U.S. Appl. No. 13/404,032, filed Feb. 24, 2012 entitled "Concerted Coordination of Multidimensional Scorecards".
U.S. Official Action mailed Mar. 5, 2012 in U.S. Appl. No. 11/623,953.
MrExcel Consulting, Using Excel to Track Student Grades; Nov. 2006; 6 pgs. (cited in Oct. 4, 2011).
Kraynak, "Absolute Beginner's Guide to Microsoft Excel 2003", Sep. 2003, Appendix A; 4 pgs. (cited in Oct. 4, 2011).
U.S. Official Action mailed Oct. 4, 2011 in U.S. Appl. No. 11/624,171.
U.S. Official Action mailed Mar. 12, 2012 in U.S. Appl. No. 11/627,640.
U.S. Official Action mailed Apr. 20, 2012 in U.S. Appl. No. 11/412,499.
U.S. Official Action mailed May 31, 2012 in U.S. Appl. No. 11/670,444.
U.S. Official Action mailed Jun. 27, 2012 in U.S. Appl. No. 11/313,899.

* cited by examiner

MULTIDIMENSIONAL METRICS-BASED ANNOTATION

BACKGROUND

Key Performance Indicators, also known as KPI or Key Success Indicators (KSI), help an organization define and measure progress toward organizational goals. Once an organization has analyzed its mission, identified all its stakeholders, and defined its goals, it needs a way to measure progress toward those goals. Key Performance Indicators are used to provide those measurements.

Scorecards are used to provide detailed and summary analysis of KPI's and aggregated KPI's such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon, for organizations to provide their raw performance data to a third party and receive scorecard representations, analysis results, and similar reports.

Many scorecard applications add a shared discussion mechanism to the same page as a scorecard and have users leave notes to each other. However, the comments may not necessarily reflect the data that is being shown in the scorecard. Moreover, after analysis has been conducted and the data has been manipulated to a specific configuration, it may be impossible to associate that configuration with specific end-user annotation. In addition to discussion threads, other annotations may increase effectiveness of scorecard experience for users.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Aspects are directed to providing annotation capability uniquely defined by a scorecard view definition and by data returned by an underlying query are enabled independent of the data's dimensionality. A report view structure is also provided for annotations such that the annotations may be filtered and combined across scorecard dimensions (rows or columns).

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5 illustrates a screenshot of another example scorecard with annotation capability turned off and on;

DETAILED DESCRIPTION

As briefly described above, a scorecard system enabling annotations independent of data dimensionality is provided allowing the annotations to be used with different scorecard configurations, filters, and the like. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
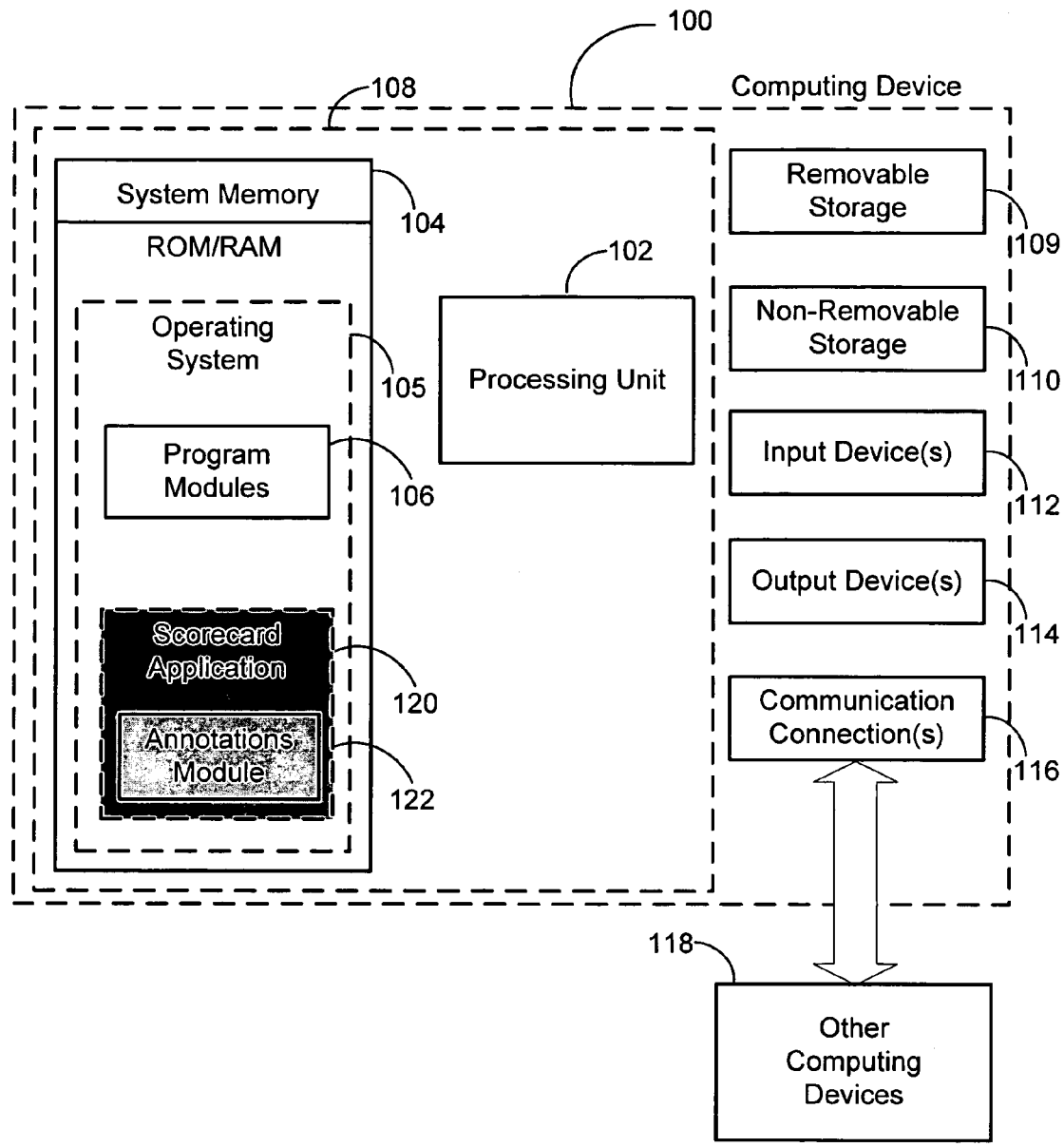
FIG. 1 is a block diagram of an exemplary computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, scorecard application 120, and annotation module 122. Scorecard application 120 manages business evaluation methods, computes KPI's, and provides scorecard data to reporting applications. In some embodiments, scorecard application 120 may itself generate reports based on metric data.

Annotation module 122 manages creation, persistent storage, and presentation of annotation within the scorecard application 120. Annotation module 122 may be an integrated part of scorecard application 120 or a separate application. Scorecard application 120 and annotation module 122 may communicate between themselves and with other applications running on computing device 100 or on other devices. Furthermore, scorecard application 120 and annotation module 122 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
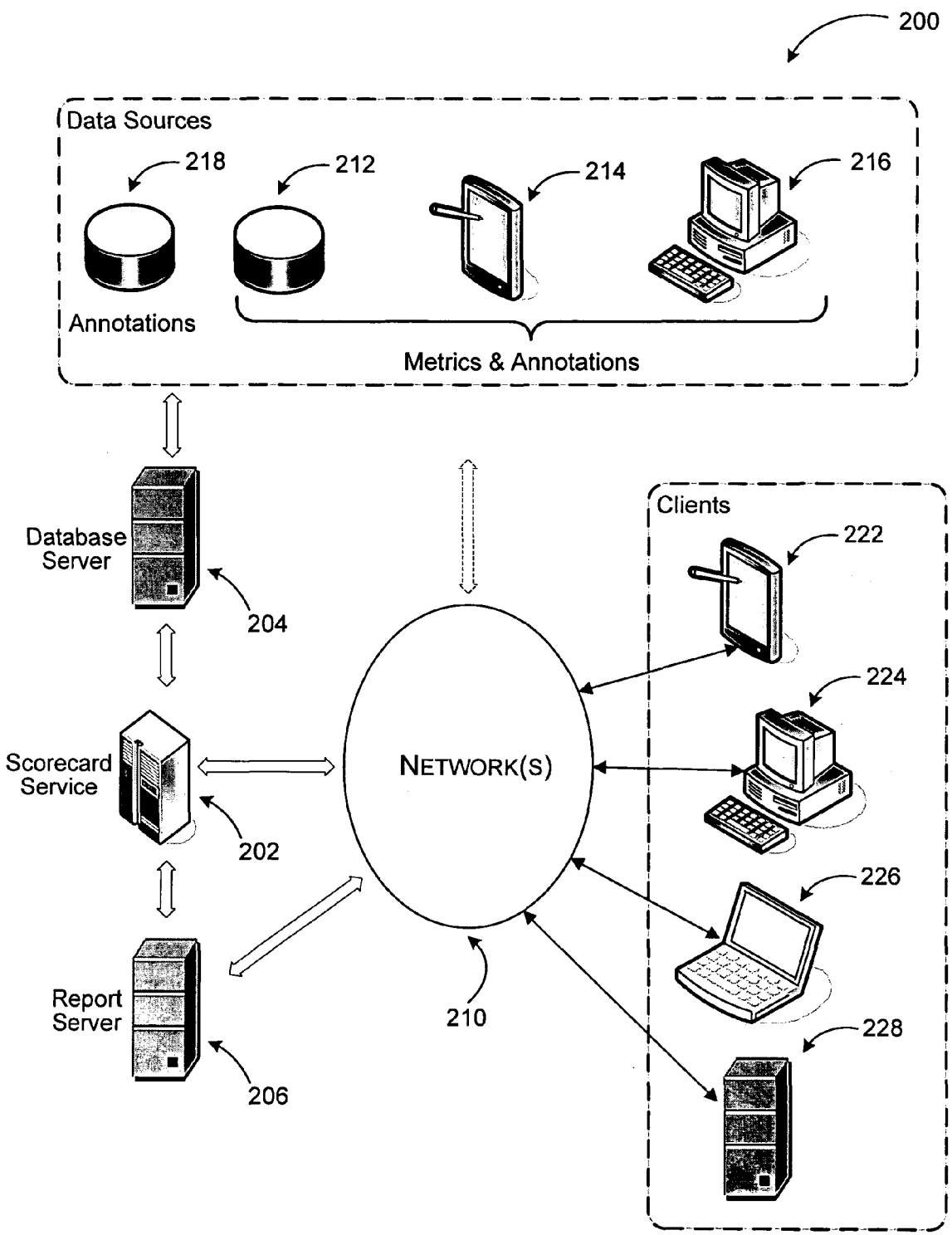
FIG. 2 illustrates a system where example embodiments may be implemented.

Referring to FIG. 2, a system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform business logic operations. Scorecard service 202, database server 204, and report server 206 may also be one or more programs or a server machine executing programs associated with the server tasks. Both clients and application servers may be embodied as single device (or program) or a number of devices (programs). Similarly, data sources may include one or more data stores, input devices, and the like.

A business logic application may be run centrally on scorecard service 202 or in a distributed manner over several servers and/or client devices. Scorecard service 202 may include implementation of a number of information systems such as performance measures, business scorecards, and exception reporting. A number of organization-specific applications including, but not limited to, financial reporting, analysis, marketing analysis, customer service, and manufacturing planning applications may also be configured, deployed, and shared in system 200. In addition, the business logic application may also be run in one or more client devices and information exchanged over network(s) 210.

Data sources 212, 214, 216, and 218 are examples of a number of data sources that may provide input to scorecard service 202 through database server 204. Additional data sources may include SQL servers, databases, non multi-dimensional data sources such as text files or EXCEL® sheets, multi-dimensional data source such as data cubes, and the like. Database server 204 may manage the data sources, optimize queries, and the like.

According to some embodiments, data sources 212, 214, and 226 may store or provide annotations in addition to scorecard metric information. According to other embodiments, data source 218 may store annotations independent of the data such that the annotations can persist across dimensions, scorecard configurations, etc. This enables a subscriber to filter annotations when building a scorecard or dynamically after the scorecard is built.

Users may interact with scorecard service 202 running the business logic application from client devices 222, 224, and 226 over network(s) 210. In one embodiment, additional applications that consume scorecard-based data may reside on scorecard service 202 or client devices 222, 224, and 226. Examples of such applications and their relation to the scorecard application are provided below in conjunction with FIG. 3.

Report server 206 may include reporting applications, such as charting applications, alerting applications, analysis applications, and the like. These applications may receive scorecard data from scorecard service 202 and provide reports directly or through scorecard service 202 to clients.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a business logic application automatically generating dashboards with scorecard metrics and subordinate reporting.

Figure 3:
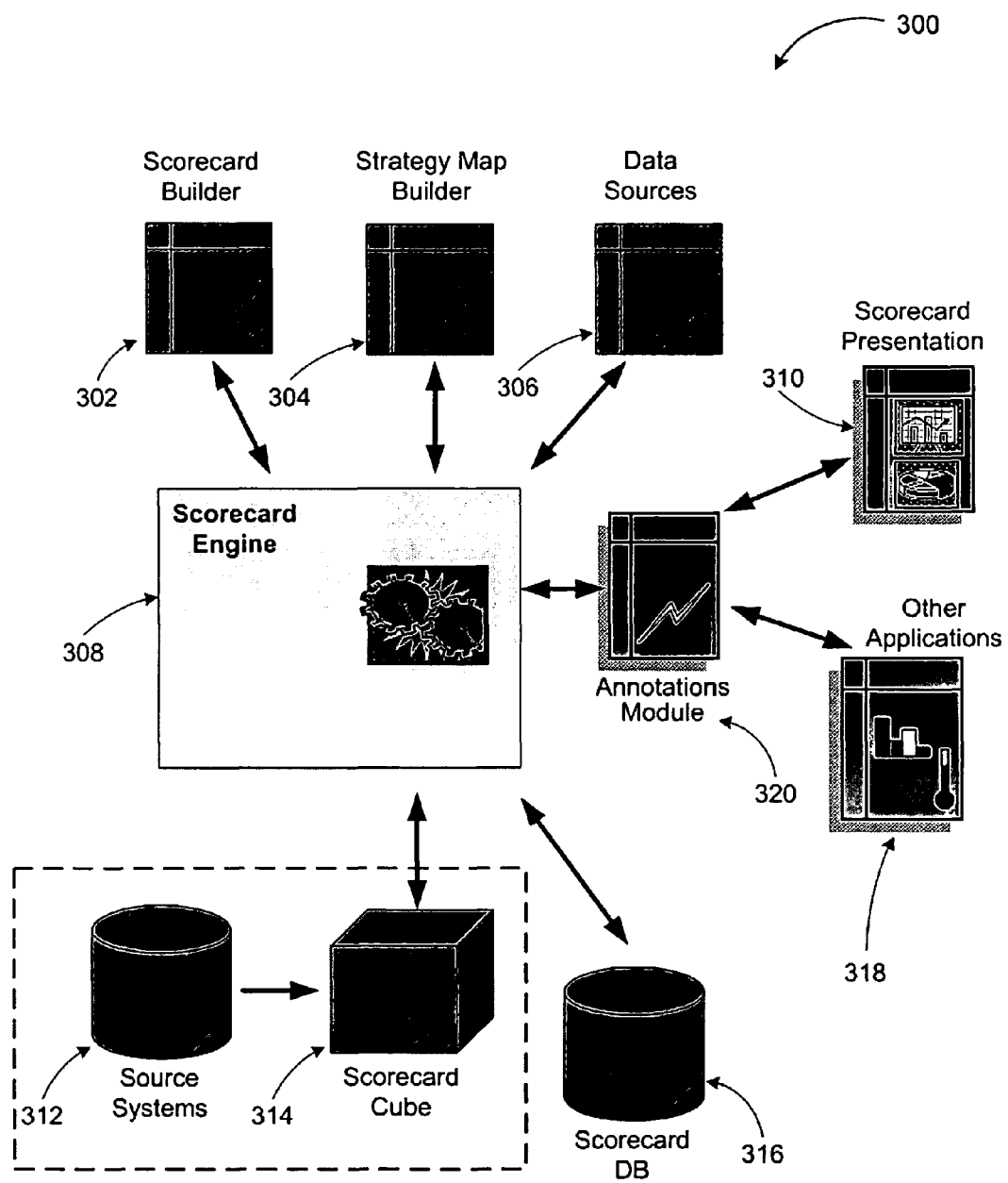
FIG. 3 illustrates an example scorecard architecture according to embodiments.

Now referring to FIG. 3, example scorecard architecture 300 is illustrated. Scorecard architecture 300 may comprise any topology of processing systems, storage systems, source systems, and configuration systems. Scorecard architecture 300 may also have a static or dynamic topology.

Scorecards are a simple method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture 300, a core of the system is scorecard engine 308. Scorecard engine 308 may be an application that is arranged to evaluate performance metrics. Scorecard engine 308 may be loaded into a server, executed over a distributed network, executed in a client device, and the like.

In addition to performing scorecard calculation, scorecard engine may also provide report parameters associated with a scorecard to other applications 318. The report parameters may be determined based on a subscriber request or a user interface configuration. The user interface configuration may include a subscriber credential or a subscriber permission attribute. The report parameter may include a scorecard identifier, a scorecard view identifier, a row identifier, a column identifier, a page filter, a performance measure group identifier, or a performance measure identifier. The performance measure may be a KPI, a KPI group, or an objective. The page filter determines a period and an organizational unit for application of the scorecard calculations.

Data for evaluating various measures may be provided by a data source. The data source may include source systems 312, which provide data to a scorecard cube 314. Source systems 312 may include multi-dimensional databases such as an Online Analytical Processing (OLAP) database, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. Scorecard cube 314 has a bi-directional interaction with scorecard engine 308 providing and receiving raw data as well as generated scorecards.

Scorecard database 316 is arranged to operate in a similar manner to scorecard cube 314. In one embodiment, scorecard database 316 may be an external database providing redundant back-up database service.

Scorecard builder 302 may be a separate application, a part of the performance evaluation application, and the like. Scorecard builder 302 is employed to configure various parameters of scorecard engine 308 such as scorecard elements, default values for actuals, targets, and the like. Scorecard builder 302 may include a user interface such as a web service, a Graphical User Interface (GUI), and the like.

Strategy map builder 304 is employed for a later stage in scorecard generation process. As explained below, scores for KPIs and parent nodes such as Objective and Perspective may be presented to a user in form of a strategy map. Strategy map builder 304 may include a user interface for selecting graphical formats, indicator elements, and other graphical parameters of the presentation.

Data Sources 306 may be another source for providing raw data to scorecard engine 308. Data sources may be comprised of a mix of several multi-dimensional and relational databases or other Open Database Connectivity (ODBC)—accessible data source systems (e.g. Excel, text files, etc.). Data sources 306 may also define KPI mappings and other associated data.

Scorecard architecture 300 may include scorecard presentation 310. This may be an application to deploy scorecards, customize views, coordinate distribution of scorecard data, and process web-specific applications associated with the performance evaluation process. For example, scorecard presentation 310 may include a web-based printing system, an email distribution system, and the like. A user interface for scorecard presentation 310 may also include an overview of available scorecards for a subscriber to select from. Scorecard presentation 310 may further include a matrix or a list presentation of the scorecard data. The scorecard presentation and one or more zones for other applications may be displayed in an integrated manner.

Annotation module 320 is configured to interact with scorecard engine 308, scorecard presentation 310, other applications 318, and manage generation, storage, and presentation of annotations across different scorecard configurations, report views, and subscriber defined filters. According to embodiments, annotations may be created on a scorecard that combines multi-dimensional as well as fixed value data. Annotations that are uniquely defined by the scorecard view definition and by data brought back from an underlying query independent of the data's dimensionality. Thus, as the scorecard is reconfigured with additional columns and or rows the annotations can remain with the data and definition.

Threaded discussions and updated document lists are enabled around the annotations with appropriate permissions and/or credentials. Utilization of annotation data stores independent from a scorecard server is also made possible. According to some embodiments, annotations may be rolled-up across dimensions (row or columns) to be used in reporting scenarios (e.g. "Show me all comments for North America for a specific product and a specific time period").

Other applications 318 may include any application that receives data associated with a report parameter and consumes the data to provide a report, perform analysis, provide alerts, perform further calculations, and the like. The data associated with the report parameter includes content data and metadata. Other applications may be selected based on the report parameter, a subscriber request, or a user interface configuration. The user interface configuration may include a subscriber credential or a subscriber permission attribute. Other applications 318 may include a graphical representation application, a database application, a data analysis application, a communications application, an alerting application, or a word processing application.

Figure 4:
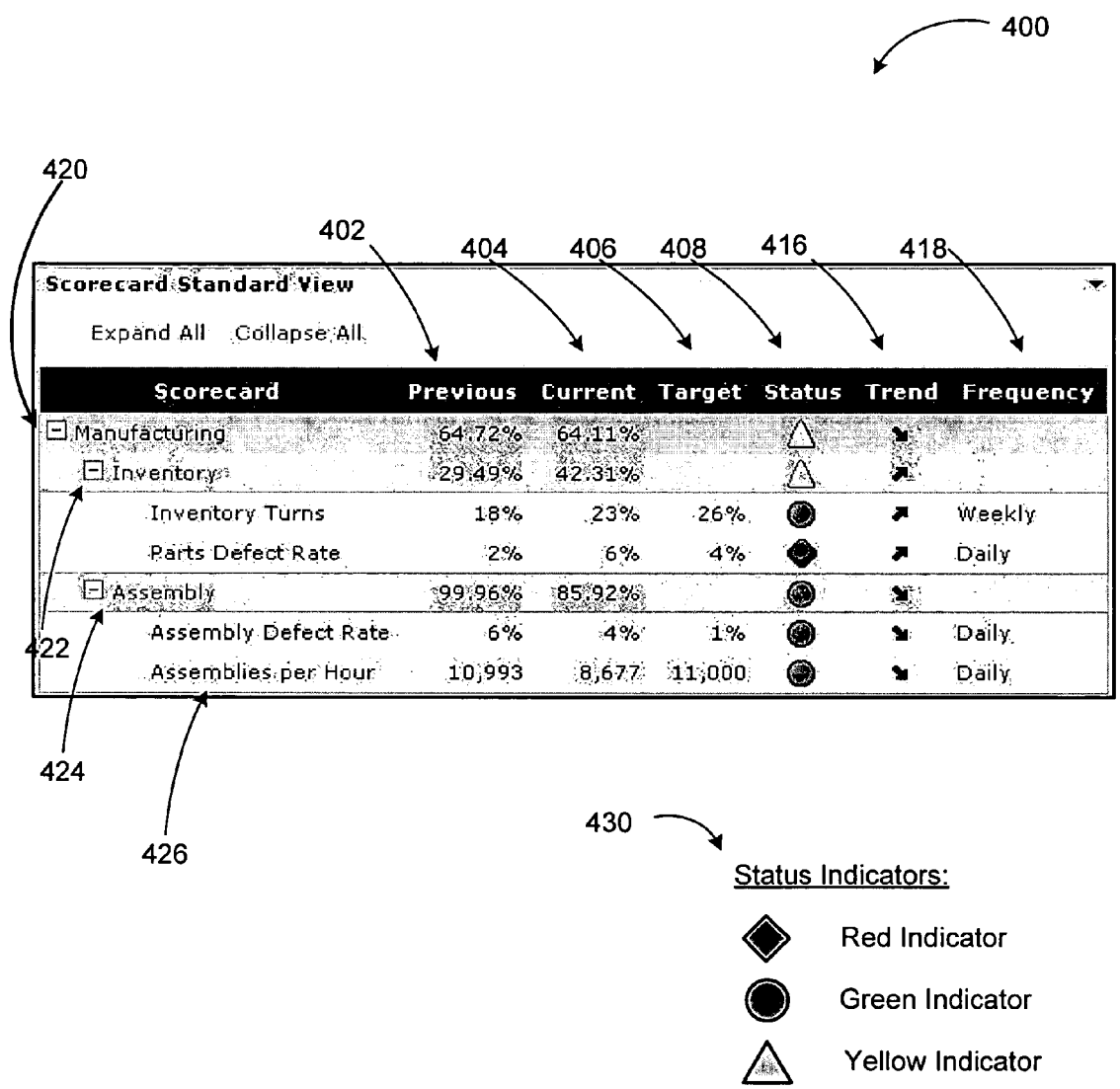
FIG. 4 illustrates a screenshot of an example scorecard.

FIG. 4 illustrates a screenshot of an example scorecard. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. The shared use of KPI definition may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes. The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The trend arrows displayed in scorecard 400 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent Objective.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of scorecard 400 shows example elements perspective 420 "Manufacturing" with objectives 422 and 424 "Inventory" and "Assembly" (respectively) reporting to it. Second column 402 in scorecard 400 shows results for each measure from a previous measurement period. Third column 404 shows results for the same measures for the current measurement period. In one embodiment, the measurement period may include a month, a quarter, a tax year, a calendar year, and the like.

Fourth column 406 includes target values for specified KPIs on scorecard 400. Target values may be retrieved from a database, entered by a user, and the like. Column 408 of scorecard 400 shows status indicators.

Status indicators 430 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Indicators with more than three levels may appear as a bar divided into sections, or bands. Column 416 includes trend type arrows as explained above under KPI attributes. Column 418 shows another KPI attribute, frequency.

Figure 5:
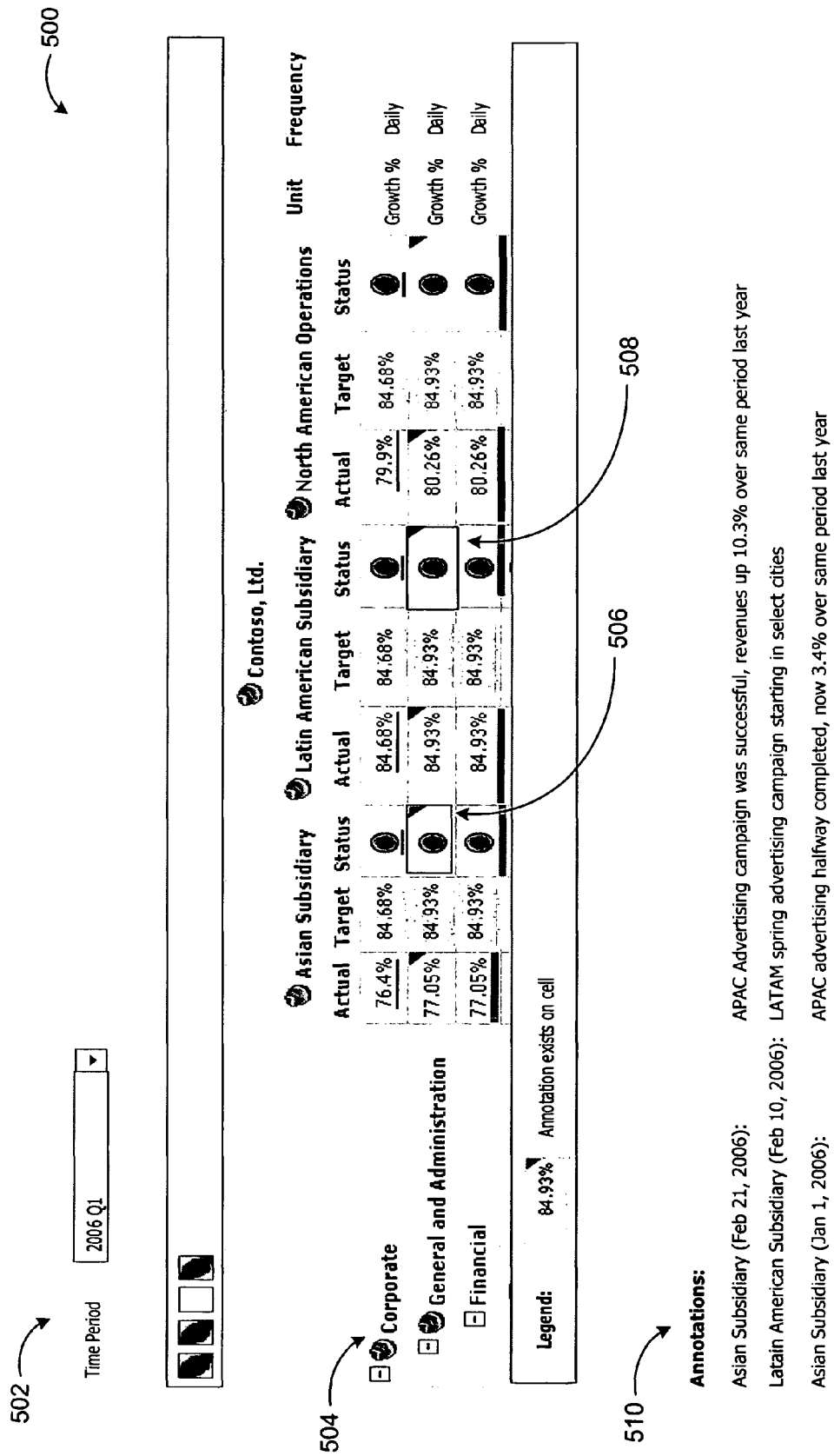

FIG. 5 illustrates a screenshot of another example scorecard with annotations emphasizing "bubble-up" capability of the annotations. According to some embodiments, a hierarchy representation may be stored for filter values. For example, time dimension may have day, week, month, quarter, or year values. An annotation entry for a specific time value may then be presented (depending on filtering parameters) in multiple time value selections. Similar hierarchical multidimensionality may be implemented for other parameters such as products, geographies, corporate structures, and the like.

Diagram 500 shows an example scorecard for time period 2006 Q1 (502). The scorecard is a typical scorecard with hierarchically structured KPI's and objectives, actuals, targets, and status indicators for different organizational units for a fictional company, Contoso, Ltd. Annotation capability is turned on in the scorecard as indicated by the legend section. The legend section may provide additional detailed information about annotations to a subscriber such as different types, etc. Annotation capability may be turned on or off for a number of reasons. Security level of a client device or the system, subscriber permission levels, system resources, and the like, are examples of why the capability may not always be provided. Scorecard application UI may provide a number of ways to turn on annotation capability such as control icons or buttons.

The columns in the scorecard represent different corporate units, Asian subsidiary, Latin American subsidiary, and North American subsidiary. Cells 506 and 508 of the scorecard include annotations 510 associated with them as indicated by the dark colored triangles on their corners. According to some embodiments, annotations are associated with scorecard elements such as cells, but independent of scorecard data dimensionality (i.e. scorecard configuration). Thus, annotations are uniquely defined by the scorecard view definition and by data returned by an underlying query. This way, the annotations can remain with the data and the definition as the scorecard is reconfigured with additional or fewer columns and or rows.

The annotations may include discussion threads, comments, document lists, and the like. For example, the annotations 510 shown in the scorecard indicate progress of advertising campaigns for different corporate units. Moreover, each annotation has a time point associated with its entry. Using the time point, annotations may be stored, indexed, ordered, or presented based on a filtering parameter associated with the time dimension. This capability provides for a feature of the annotations referred to as "bubble-up" feature herein. For example, the two annotations for the Asian subsidiary with entry time points of Jan. 1 and Feb. 21 of 2006 may be ordered or indexed based on their time points. Furthermore, each annotation may bubble up in report views where the time dimension parameter is monthly, quarterly, or annual. For example, the Asian subsidiary annotations may be presented in a view filtered for Q1 of 2006 or for 2006 as a whole year. According to another embodiment, a scorecard application providing annotation capability may also filter the annotations based on a number of other parameters including, but not limited to, subscriber permission level(s), subscriber preferences, temporal selection, geographic selection, and the like. For example, for annotation that include discussion threads, the application creating the scorecard may restrict subscribers who are allowed to add to the discussion thread based on their permission level for a particular cell. Similarly, viewing (or presentation in a report view UI) of the annotations may also be filtered based on likewise parameters.

Actions that may be performed on the scorecard in FIG. 5 may include adding an annotation, viewing an annotation, updating an annotation, or removing an annotation. As explained above, any of these actions may be limited based on permission levels. Temporal or geographic filtering may include combining or limiting entries of discussion threads based on predefined or subscriber specified selection such as Asia and Latin America, or Q1 of 2006.

Moreover, a multiselect function may be provided according to some embodiments. Multiple cells may be selected graphically or otherwise for combining annotations associated with those cells in a report view presentation. The combination does not have to be a simple addition of all annotations of the selected cells, however. Through an interactive process, the annotations associated with the selected cells may be combined employing any logic operation such as AND, OR, and the like.

Embodiments are not limited to the example scorecard layouts, annotation types and indications described above. Annotation capability in a scorecard may be provided in many other ways using the principles described herein.

Figure 6:
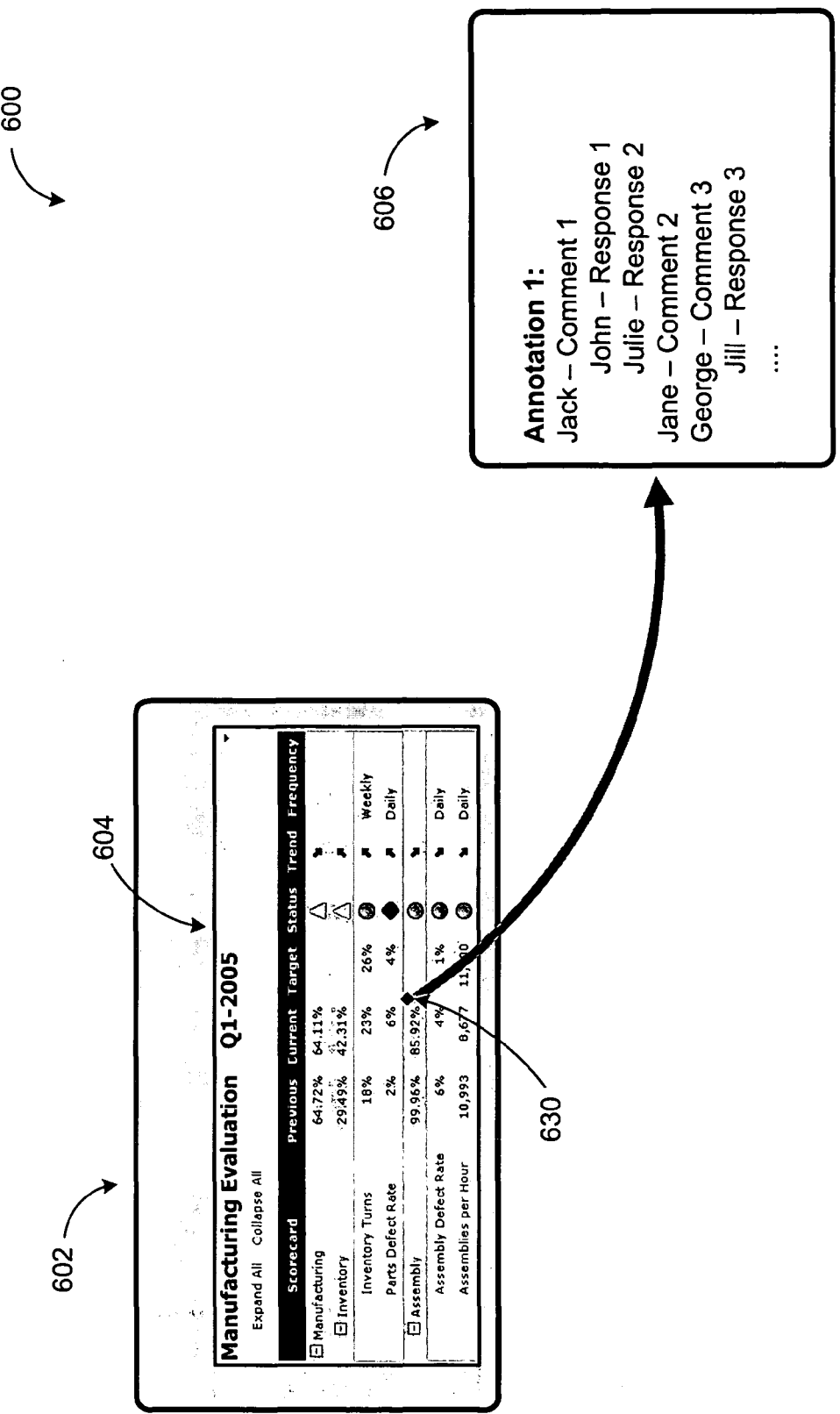
FIG. 6 illustrates report view presentation of an annotation based on a discussion thread.

FIG. 6 illustrates report view presentation of an annotation based on a discussion thread. Diagram 600 includes scorecard application UI 602 with scorecard 604 and report view UI 606 with annotation 630.

Scorecard application UI 602 is the scorecard presentation screen of a scorecard application. It presents example scorecard 604 for "Manufacturing Evaluation" for first quarter of 2005 (Q1-2005). Elements of scorecard 604 such as KPI's, objectives, columns, indicators, and the like have been described previously. One of the cells of scorecard 604 includes annotation 630, which represents a discussion thread associated with the cell.

As mentioned previously, a preview of the annotation (in this case the discussion thread) may be provided in the scorecard view, for example by right clicking on the selected cell. According to some embodiments, the annotation may also be presented in a report view format as shown in report view UI 606. The report view editor lists all entries of the discussion thread in a predefined format. The entries in the discussion thread are typically from subscribers with sufficient permission. The viewing of the report view UI 606 may also be filtered, however, based on permission level of the viewer and other parameters such as time, geography, and the like. According to other embodiments, a subscriber may be enabled to further filter the annotation presentation by specifying or modifying filter parameters after the report view has been presented.

Figure 7:
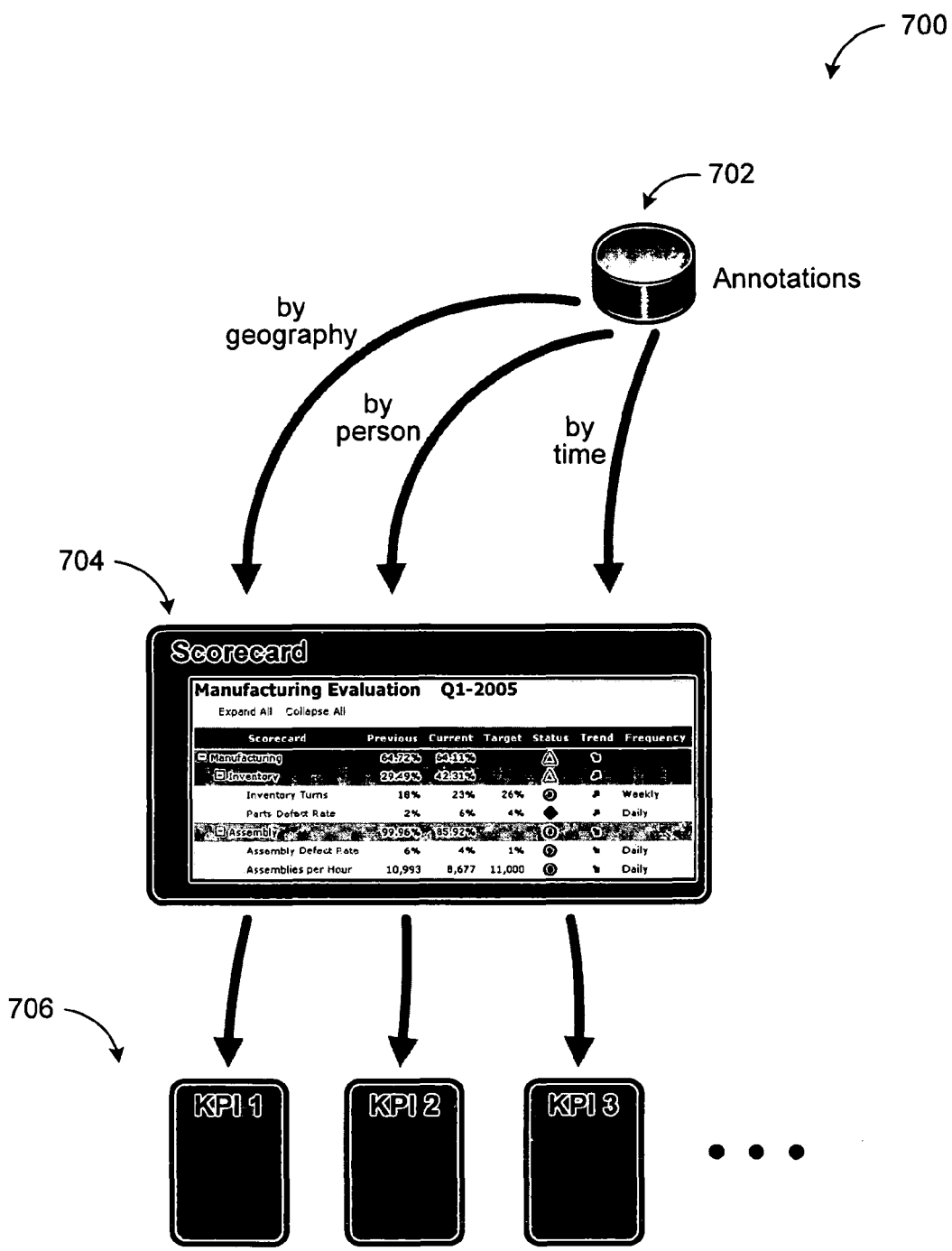
FIG. 7 illustrates a persistent architecture of annotations in a scorecard system.

FIG. 7 illustrates a persistent architecture of annotations in a scorecard system. As diagram 700 shows, the annotation architecture includes in its core an annotations data store 702. Annotations stored independently from a scorecard data dimensionality may be filtered by geography, time, person, and the like, before being provided to a scorecard configuration 704. As explained previously, scorecards may be built by reconfiguring elements of existing scorecards. Thus, a scorecard built from an existing one may also inherit annotations associated with the elements of the original scorecard.

Once the new scorecard configuration is put together, the annotations may then be provided to individual KPIs 706 (KPI 1 through 3). For example, an original scorecard for the North American business unit of an enterprise may include a document list associated with sales targets for a particular year. A subscriber may build a new scorecard for worldwide sales of the whole enterprise bringing in the sales KPIs from individual scorecards for regional business units. When the North American sales KPI is pulled into the new scorecard, the annotations associated with the sales target element may also be inherited making the document list available to the viewers of the new scorecard.

The example implementations of annotations, scorecards, and views in FIGS. 4 through 7 are intended for illustration purposes only and should not be construed as a limitation on embodiments. Other embodiments may be implemented using the principles described herein.

Figure 8:
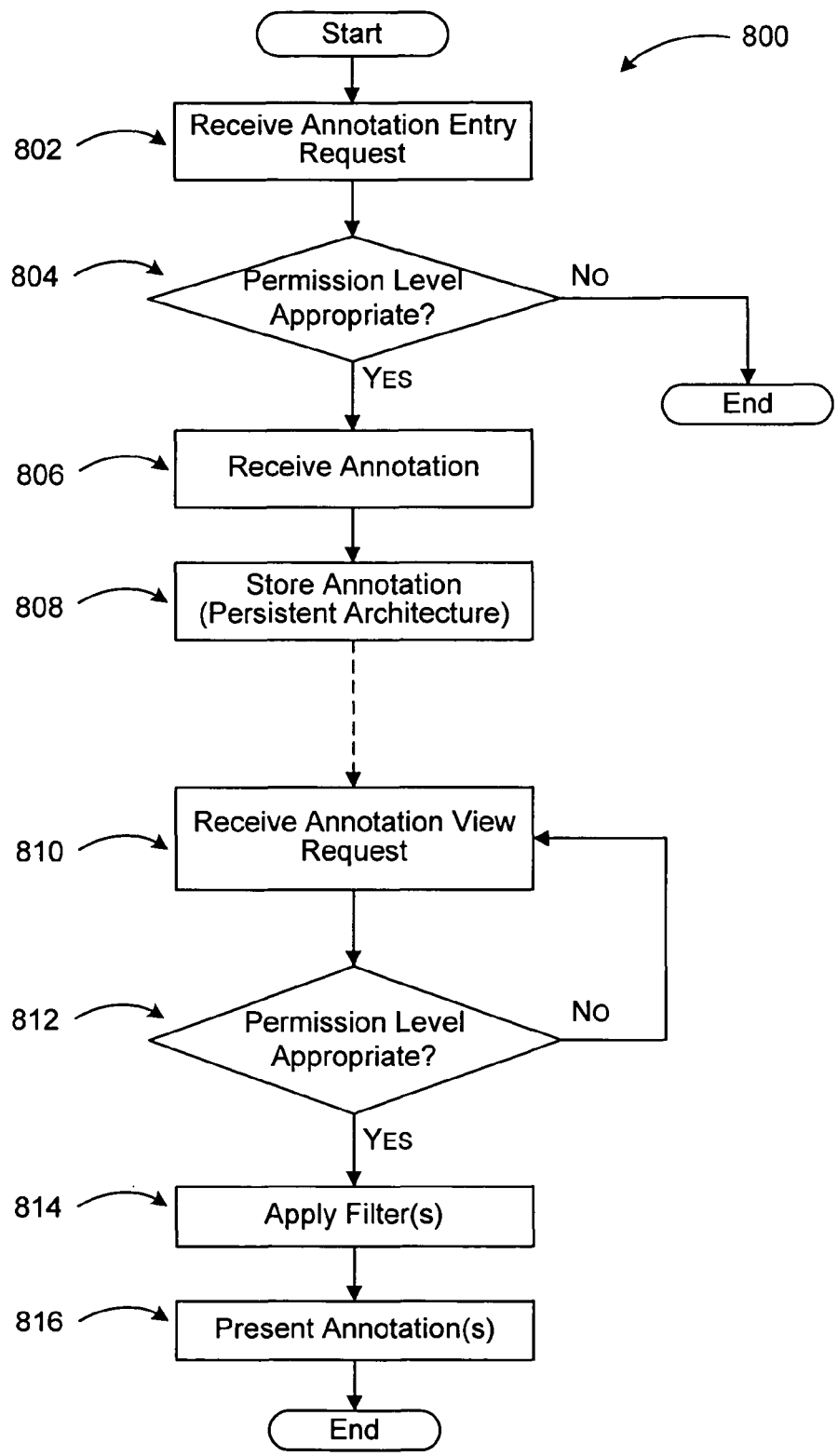
FIG. 8 illustrates a logic flow diagram of a process for using annotations within a scorecard architecture in a business logic system.

FIG. 8 illustrates a logic flow diagram of a process for using annotations within a scorecard architecture in a business logic system. Process 800 may be implemented in a business logic application.

Process 800 begins with operation 802, where a request to enter an annotation is received. Elements of a scorecard that can be annotated may be graphically indicated (e.g. distinct color, marker, etc.) in the scorecard presentation. A subscriber may indicate his/her request to add annotation by clicking on a marker, activating a button, and the like. In some embodiments, the subscriber may enter an annotation multi-dimensionally by filtering and/or clicking on a cell that represents a multi-dimensional value (For example, the Asian subsidiary in FIG. 5). Annotations may then be stored, indexed, ordered, or presented based on their dimensionality. Processing advances from operation 802 to decision operation 804.

At decision operation 804, a determination is made whether the requesting subscriber has sufficient permission level(s). For example, a discussion thread for a KPI may be restricted to executive level subscribers only. Thus, a subscriber without the requisite permission level may not be allowed to add to the discussion thread for that particular KPI. If the decision at operation 804 is negative, processing may terminate. If the subscriber has proper permission level(s), processing proceeds to operation 806.

At operation 806, the annotation is received. As described previously, the annotation may include a comment, an entry for a discussion thread, an entry for a document list, and the like. Processing moves from operation 806 to operation 808.

At operation 808, the annotation is stored such that a persistent structure for the annotation is preserved. Thus, the stored annotation can be viewed or otherwise used in a reporting structure independent of a data dimensionality. The discussion associated with FIG. 6 explains in more detail how persistent annotations can be used across dimensions and configurations. The annotation may be stored in a scorecard data store in conjunction with the scorecard data, or it may be stored in an independent annotation data store. Once the annotation is stored, it may be made available to the whole scorecard architecture for use in different configurations and reporting presentations. The second portion of the flowchart beginning with operation 810 shows such a use of the annotation after it has been stored.

Operation 810 is illustrated as following operation 808 with a dashed line. This connection is intended to show that other operations may take place between the two operations, or one may not necessarily follow the other in a chronological order. At operation 810, a request to view the annotation is received. Examples of such a request include a real time action by a subscriber viewing the scorecard, a reporting application preparing a report presentation that includes the annotations, and the like. Processing advances from operation 810 to decision operation 812.

At decision operation 812, a determination is made whether the requesting subscriber has sufficient permission level(s). For example, a discussion thread or individual annotation for a particular scorecard element (e.g. target values for a specific KPI) may be restricted to executive level subscribers only. Thus, a subscriber without the requisite permission level may not be allowed to view the whole discussion thread or portions of the thread associated with that particular scorecard element. If the decision at operation 812 is negative, processing may return to operation 810. If the subscriber has proper permission level(s), processing proceeds to operation 814.

At operation 814, one or more filters are applied to the annotation(s). Filters may include temporal filters, logic combinations of scorecard elements (cells), subscriber credentials, geographic filters, organizational architecture filters, and the like. For example, a discussion thread may be filtered to include entries for Q1 of 2006 only and for North America and Asia business units of an enterprise. As discussed before, the filters may combine different conditions in any logic combination such as AND, OR, etc. Processing moves from operation 814 to operation 816.

At operation 816, the annotation(s) is (are) presented in the requested format, such as a report presentation. Annotations may be presented in many formats including, but not limited to, pop-ups, separate reports, separate displays (e.g. scorecard view is presented on one display, a selected annotation is presented on another display), and the like. After operation 816, processing moves to a calling process for further actions.

The operations included in process 800 are for illustration purposes. Using persistent annotations within a scorecard architecture may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-readable storage medium device having computer-executable instructions which when executed perform a method for recording and presenting annotations in a scorecard, the method executed by the computer-executable instructions comprising:
    receiving a plurality of annotations corresponding to an associated scorecard element, each of the plurality of annotations including a dimension parameter;
    storing the plurality of annotations based on the associated scorecard element and the dimension parameter such that the plurality of annotations are independent from a configuration of the scorecard;
    receiving a selection of multiple elements of the scorecard, wherein receiving the selection of multiple elements of the scorecard comprises receiving a request to view any annotations associated with the selected elements; and
    providing the plurality of annotations associated with the selected elements of the scorecard for a report view presentation based on a filtering of the dimension parameter, wherein providing the plurality of annotations for the report view presentation based on the filtering of the dimension parameter comprises:
        combining each selected element's corresponding annotations,
        sorting the combined annotations based on the dimension parameter, and
        presenting the combined and sorted annotations in the report view presentation.

2. The computer-readable storage medium device of claim 1, wherein the filtering of the dimension parameter includes a filtering of at least one from a set of: time, product, geographic configuration, and organizational structure.

3. The computer-readable storage medium device of claim 1, further comprising confirming a permission attribute based on a subscriber credential and the scorecard element.

4. The computer-readable storage medium device of claim 1, further comprising filtering individual entries of a discussion thread prior to the report view presentation based on a predefined set of conditions.

5. The computer-readable storage medium device of claim 4, wherein filtering based on the predefined set of conditions comprises filtering based on the predefined set of conditions that: is determined by one of a subscriber and an administrator, and includes at least one from a set of selection by geography, selection by subscriber credential, and selection by time.

6. A system for using persistent scorecard annotations in a business logic system, the system comprising:
    a scorecard application, operatively associated with at least one computing system comprising a memory storage and a processing unit coupled to the memory storage, configured to compute scorecard metrics and provide a scorecard presentation based on the computed scorecard metrics; and
    an annotation module, operatively associated with the at least one computing system, configured to:
        record at least one annotation associated with a scorecard element in a scorecard, the at least one annotation associated with the scorecard element being further associated with at least one time value,
        restrict the at least one annotation if the annotation was not received from a permitted source allowed to annotate a cell of the scorecard,
        provide an indication of the at least one annotation within the associated scorecard element in the scorecard, the indication comprising a displayed icon within the scorecard element,
        receive a request to view, simultaneously, any annotations associated with multiple scorecard elements in the scorecard;
        combine each annotation associated with the multiple scorecard elements in the scorecard;
        filter the combined annotations based on a filtering parameter, the filtering parameter comprising a temporal parameter, and
        provide the combined and filtered annotations for a report view presentation, the combined and filtered annotations being provided in multiple time values based on the temporal parameter.

7. The system of claim 6, wherein the annotation module is further configured to provide a preview of the at least one annotation as part of the scorecard presentation.

8. The system of claim 6, wherein the annotation module is further configured to enable a subscriber to perform at least one action from a set of read, create, delete, and update actions associated with the at least one annotation based on a permission attribute assigned to the subscriber.

9. The system of claim 6, wherein the annotation module is configured to filter the recorded at least one annotation dynamically when at least one of an element and a configuration of the scorecard is modified.

10. The system of claim 6, wherein the annotation module is further configured to combine a plurality of annotations associated with distinct cells of the scorecard employing a logic operation.

11. The system of claim 6, wherein the annotation module is integrated with the scorecard application.

12. A method for recording and presenting annotations in a scorecard system, the method comprising:
- receiving, by a computer, a plurality of annotations corresponding to a scorecard element of a scorecard, each of the plurality of annotations including a dimension parameter;
- storing the plurality of annotations based on the scorecard element and the dimension parameter such that the plurality of annotations are independent from a configuration of the scorecard;
- receiving a selection of multiple elements of the scorecard, wherein receiving the selection of multiple elements of the scorecard comprises receiving a request to view any annotations associated with the selected elements of the scorecard; and
- providing the plurality of annotations associated with the selected elements of the scorecard for a report view presentation based on a filtering of the dimension parameter, wherein providing the plurality of annotations for the report view presentation based on the filtering of the dimension parameter comprises:
- combining each selected element's corresponding annotations,
- sorting the combined annotations based on the dimension parameter, and
- presenting the combined and sorted annotations in the report view presentation.

13. The method of claim 12, wherein the filtering of the dimension parameter includes a filtering of at least one from a set of: time, product, geographic configuration, and organizational structure.

14. The method of claim 12, further comprising confirming a permission attribute based on the element of the scorecard.

15. The method of claim 12, further comprising confirming a permission attribute based on a subscriber credential.

16. The method of claim 12, further comprising filtering individual entries of a discussion thread prior to the report view presentation based on a predefined set of conditions.

17. The method of claim 16, wherein filtering based on the predefined set of conditions comprises filtering based on the predefined set of conditions that is determined by a subscriber and includes at least one from a set of selection by geography, selection by subscriber credential, and selection by time.

18. The method of claim 16, wherein filtering based on the predefined set of conditions comprises filtering based on the predefined set of conditions that is determined by an administrator and includes at least one from a set of selection by geography, selection by subscriber credential, and selection by time.

* * * * *